US011114091B2

(12) United States Patent
Xiong et al.

(10) Patent No.: US 11,114,091 B2
(45) Date of Patent: Sep. 7, 2021

(54) METHOD AND SYSTEM FOR PROCESSING AUDIO COMMUNICATIONS OVER A NETWORK

(71) Applicant: Tencent Technology (Shenzhen) Company Limited, Shenzhen (CN)

(72) Inventors: Fei Xiong, Shenzhen (CN); Jinghui Shi, Shenzhen (CN); Lei Chen, Shenzhen (CN); Min Ren, Shenzhen (CN); Feixiang Peng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 16/599,009

(22) Filed: Oct. 10, 2019

(65) Prior Publication Data

US 2020/0043481 A1    Feb. 6, 2020

Related U.S. Application Data

(63) Continuation of application No. PCT/CN2017/109210, filed on Nov. 3, 2017.

(51) Int. Cl.
*G10L 15/18* (2013.01)
*G06F 40/279* (2020.01)
(Continued)

(52) U.S. Cl.
CPC ........ *G10L 15/1822* (2013.01); *G06F 40/205* (2020.01); *G06F 40/279* (2020.01);
(Continued)

(58) Field of Classification Search
CPC . G10L 15/1822; G10L 15/005; G06F 20/279; G06F 20/58205; H04L 65/601; H04W 24/06
See application file for complete search history.

(56) References Cited

U.S. PATENT DOCUMENTS

| 6,385,580 B1 * | 5/2002 | Lyberg | G06T 13/205 |
| | | | 704/258 |
| 8,706,486 B1 * | 4/2014 | Devarajan | G06F 21/6245 |
| | | | 704/235 |

(Continued)

FOREIGN PATENT DOCUMENTS

| CN | 104142915 A | 11/2014 |
| CN | 105049950 A | 11/2015 |

(Continued)

OTHER PUBLICATIONS

Kapse et al., "An optimized approach to voice translation on mobile phones," IJRET, vol. 03, issue 03, Mar. 2014. (Year: 2014).*

(Continued)

*Primary Examiner* — Anne L Thomas-Homescu
(74) *Attorney, Agent, or Firm* — Morgan, Lewis & Bockius LLP

(57) ABSTRACT

A method of processing audio communications over a network, comprising: at a first client device: receiving a first audio transmission from a second client device that is provided in a source language distinct from a default language associated with the first client device; obtaining current user language attributes for the first client device that are indicative of a current language used for the communication session at the first client device; if the current user language attributes suggest a target language currently used for the communication session at the first client device is distinct from the default language associated with the first client device: obtaining a translation of the first audio transmission from the source language into the target language; and presenting the translation of the first audio transmission in the target language to a user at the first client device.

17 Claims, 19 Drawing Sheets

(51) Int. Cl.
*G06F 40/58* (2020.01)
*G06F 40/205* (2020.01)
*G10L 15/00* (2013.01)
*H04L 29/06* (2006.01)
*H04W 24/06* (2009.01)

(52) U.S. Cl.
CPC ............ *G06F 40/58* (2020.01); *G10L 15/005* (2013.01); *H04L 65/601* (2013.01); *H04W 24/06* (2013.01)

(56) References Cited

U.S. PATENT DOCUMENTS

| | | | | |
|---|---|---|---|---|
| 8,779,265 | B1* | 7/2014 | Gottlieb | G10H 1/0033 84/600 |
| 2004/0102957 | A1* | 5/2004 | Levin | G06F 40/58 704/3 |
| 2010/0185434 | A1* | 7/2010 | Burvall | G10L 15/005 704/3 |
| 2010/0256972 | A1* | 10/2010 | Grenier | G06F 40/58 704/2 |
| 2013/0238312 | A1* | 9/2013 | Waibel | G10L 15/1815 704/8 |
| 2015/0220512 | A1* | 8/2015 | Heinemeyer | G10L 15/005 704/2 |
| 2015/0347395 | A1* | 12/2015 | Cuthbert | G06F 16/683 704/2 |
| 2015/0347399 | A1* | 12/2015 | Aue | H04M 11/10 704/2 |
| 2016/0110349 | A1* | 4/2016 | Norman-Rosedam | G06F 40/58 704/3 |
| 2017/0364509 | A1* | 12/2017 | Cordell | G06F 40/58 |
| 2018/0115645 | A1* | 4/2018 | Iyer | G06Q 10/063112 |
| 2018/0174591 | A1* | 6/2018 | Kurian | G10L 13/02 |
| 2018/0261307 | A1* | 9/2018 | Couse | G16H 80/00 |
| 2018/0376218 | A1* | 12/2018 | Wu | H04N 21/2668 |
| 2019/0108834 | A1* | 4/2019 | Nelson | G06Q 10/10 |

FOREIGN PATENT DOCUMENTS

| | | |
|---|---|---|
| CN | 105139849 A | 12/2015 |
| CN | 105511857 A | 4/2016 |
| CN | 105529038 A | 4/2016 |
| CN | 106649290 A | 5/2017 |
| CN | 107015970 A | 8/2017 |
| CN | 107079069 A | 8/2017 |
| WO | WO 2016062641 A1 | 4/2016 |

OTHER PUBLICATIONS

Tencent Technology, ISRWO, PCT/CN2017/109210, Jul. 30, 2018, 7 pgs.
Tencent Technology, IPRP, PCT/CN2017/109210, May 5, 2020, 5 pgs.

\* cited by examiner obtaining one or more current user language attributes for the first client device, wherein the one or more current user language attributes are indicative of a current language that is used for the audio and/or video communication session at the first client device includes: — 604 obtaining the one or more current user language attributes for the first client device includes obtaining facial features of the user at the first client device and obtaining geolocation information of the first client device — 612 the facial features of the user at the first client device and the geolocation information of the first client device are utilized in combination to suggest the target language as the current language that is used for the first client device — 614 obtaining the one or more current user language attributes for the first client device includes obtaining an audio input received locally at the first client device during the audio and/or video communication session — 616 the audio input that is received locally at the first client device is analyzed linguistically to suggest the target language as the current language that is used at the first client device — 618

Figure 6B receiving the first audio transmission from the second client device further includes: →702

D receiving two or more audio packets of the first audio transmission from the second client device, wherein the two or more audio packets have been sent from the second client device sequentially according to respective timestamps of the two or more audio packets, and wherein each respective timestamp is indicative of a start time of a corresponding audio paragraph identified in the first audio transmission →742 obtaining the translation of the first audio transmission from the source language into the target language and sending the translation of the first audio transmission in the target language to the first client device further comprise: →708, 710 obtaining respective translations of the two or more audio packets from the source language into the target language sequentially according to the respective timestamps of the two or more audio packets →744 sending a first translation of at least one of the two or more audio packets to the first client device after the first translation is completed and before translation of at least another one of the two or more audio packets is completed →746

Figure 7E

METHOD AND SYSTEM FOR PROCESSING AUDIO COMMUNICATIONS OVER A NETWORK

CROSS-REFERENCE TO RELATED APPLICATION

This application is a continuation application of PCT/CN2017/109210, entitled "METHOD AND SYSTEM FOR PROCESSING AUDIO COMMUNICATIONS OVER A NETWORK" filed on Nov. 3, 2017, which is incorporated by reference in its entirety.

FIELD OF THE TECHNOLOGY

The present disclosure relates to the field of Internet technologies, and in particular, to a method and system for processing audio communications over a network.

BACKGROUND OF THE TECHNOLOGY

The development of Internet technologies along with real-time audio and video communications over a network makes communication between people extremely convenient. When people communicate using the same language, speech audio captured at both ends of the communication channel can be transmitted in a duplex manner, and be output at the receiving ends with no substantial delay. However, sometimes, people in the communication session use different languages, and real-time translation is needed in order to help the people communicate effectively. Sometimes, the language that are used are not necessarily specified beforehand, and setting up a translation preference in an ad hoc manner can be time consuming and cumbersome, which negatively affects user experience.

SUMMARY

As discussed in the background, manually set up a translation preference before an audio/video communication session is established may work well for some scenarios, but cannot address the problem with unforeseen translation needs or impromptu communications with others whose language preferences are yet unknown. For example, in a group conference scenario or customer support scenario, the speakers in the group conference may prefer to use different languages and the languages may not be known before the communication session is established or before each participant speaks. Furthermore, the languages that are spoken in a communication can change in a relatively unpredictable way, when different people speak using the same client device at different times during the communication session. Trying to manually adjust the translation preferences (e.g., manually specifying the source and target language) after the communication session has already started and after the users have started speaking cause unnecessary delays and disruptions to the communications between the users. The solutions disclosed herein may address the above deficiencies of the present technology.

As disclosed herein, in some embodiments, a method of processing audio communications over a network, comprising: at a first client device that has one or more processors and memory, the first client device having established an audio and/or video communication session with a second client device over the network: during the audio and/or video communication session: receiving a first audio transmission from the second client device, wherein the first audio transmission is provided by the second client device in a source language that is distinct from a default language associated with the first client device; obtaining one or more current user language attributes for the first client device, wherein the one or more current user language attributes are indicative of a current language that is used for the audio and/or video communication session at the first client device; in accordance with a determination that the one or more current user language attributes suggest a target language that is currently used for the audio and/or video communication session at the first client device, and in accordance with a determination that the target language is distinct from the default language associated with the first client device: obtaining a translation of the first audio transmission from the source language from the source language into the target language; and presenting the translation of the first audio transmission in the target language to a user at the first client device.

In some embodiments, a method of processing audio communications over a network, comprising: at a sever that has one or more processors and memory, wherein, through the server, a first client device has established an audio and/or video communication session with a second client device over the network: during the audio and/or video communication session: receiving a first audio transmission from the second client device, wherein the first audio transmission is provided by the second client device in a source language that is distinct from a default language associated with the first client device; obtaining one or more current user language attributes for the first client device, wherein the one or more current user language attributes are indicative of a current language that is used for the audio and/or video communication session at the first client device; in accordance with a determination that the one or more current user language attributes suggest a target language that is currently used for the audio and/or video communication session at the first client device, and in accordance with a determination that the target language is distinct from the default language associated with the first client device: obtaining a translation of the first audio transmission from the source language into the target language; and sending, to the first client device, the translation of the first audio transmission in the target language, wherein the translation is presented to a user at the first client device.

In accordance with some embodiments, an electronic device includes a display, optionally a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, optionally a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, optionally a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, optionally a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, optionally a touch-sensitive surface, optionally one or more sensors to detect intensities of contacts with the touch-sensitive surface, and optionally one or more tactile output generators, includes means for performing or causing performance of the operations of any of the methods described herein.

In some embodiments, a computing device (e.g., server system 108, 204, FIGS. 1, 2; client devices 104, 200, 202, FIGS. 1 and 2; or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., server system 108, 204, FIGS. 1, 2; client devices 104, 200, 202, FIGS. 1 and 2; or a combination thereof) with one or more processors, cause the computing device to perform, or control performance of, the operations of any of the methods described herein. In some embodiments, a computing device (e.g., server system 108, 204, FIGS. 1, 2; client devices 104, 200, 202, FIGS. 1 and 2; or a combination thereof) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIGS. 6A-6G illustrate a flowchart diagram of a method of processing audio communication in accordance with some embodiments.

FIGS. 7A-7F illustrate a flowchart diagram of a method of processing audio communication in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
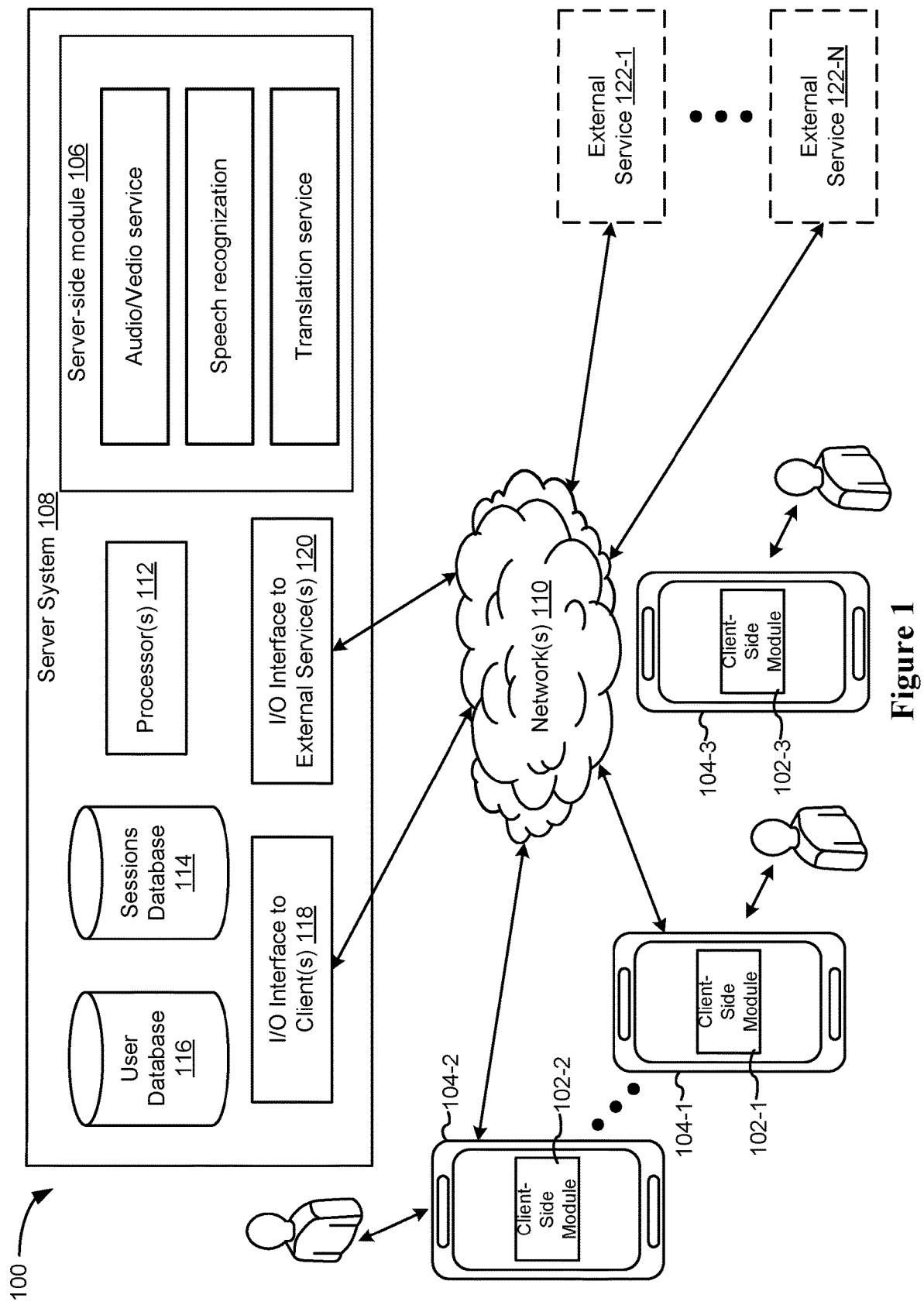
FIG. 1 is a block diagram of a server-client environment in accordance with some embodiments.

As shown in FIG. 1, data processing for a real-time audio/video communication platform is implemented in a server-client environment 100 in accordance with some embodiments. In accordance with some embodiments, server-client environment 100 includes client-side processing 102-1, 102-2, 102-3 (hereinafter "client-side modules 102") executed on a client device 104-1, 104-2, 104-3 and server-side processing 106 (hereinafter "server-side module 106") executed on a server system 108. Client-side module 102 communicates with server-side module 106 through one or more networks 110. Client-side module 102 provides client-side functionalities for the social networking platform and communications with server-side module 106. Server-side module 106 provides server-side functionalities for the social networking platform for any number of client modules 102 each residing on a respective client device 104.

In some embodiments, server-side module 106 includes one or more processors 112 (e.g., processors 902 in FIG. 9), session databases 114, user databases 116, an I/O interface 118 to one or more clients, and an I/O interface 120 to one or more external services. I/O interface 118 to one or more clients facilitates the client-facing input and output processing for server-side module 106. Session database 114 stores preset preferences for communication sessions (e.g., virtual conference rooms) that users have established, and user database 116 stores user profiles for users of the communication platform. I/O interface 120 to one or more external services facilitates communications with one or more external services 122 (e.g., web servers or cloud-based service providers such as file sharing and data storage services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point of sale (POS) terminal, vehicle-mounted computer, an ebook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server system 108 also implements various modules for supporting real-time audio/video communications such as communications in an online virtual conference room by multiple users located at different locations, including audio/video service module 124, speech-to-text module 126, and translation service module 128, etc.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of the server, the corresponding actions performed by the client device would be apparent to ones skilled in the art without any creative efforts. Furthermore, some aspects of the present technology may be performed by the server, the client device, or the server and the client cooperatively.

Attention is now directed towards embodiments of user interfaces and associated processes that may be implemented on a client device 104.

Figure 2A:
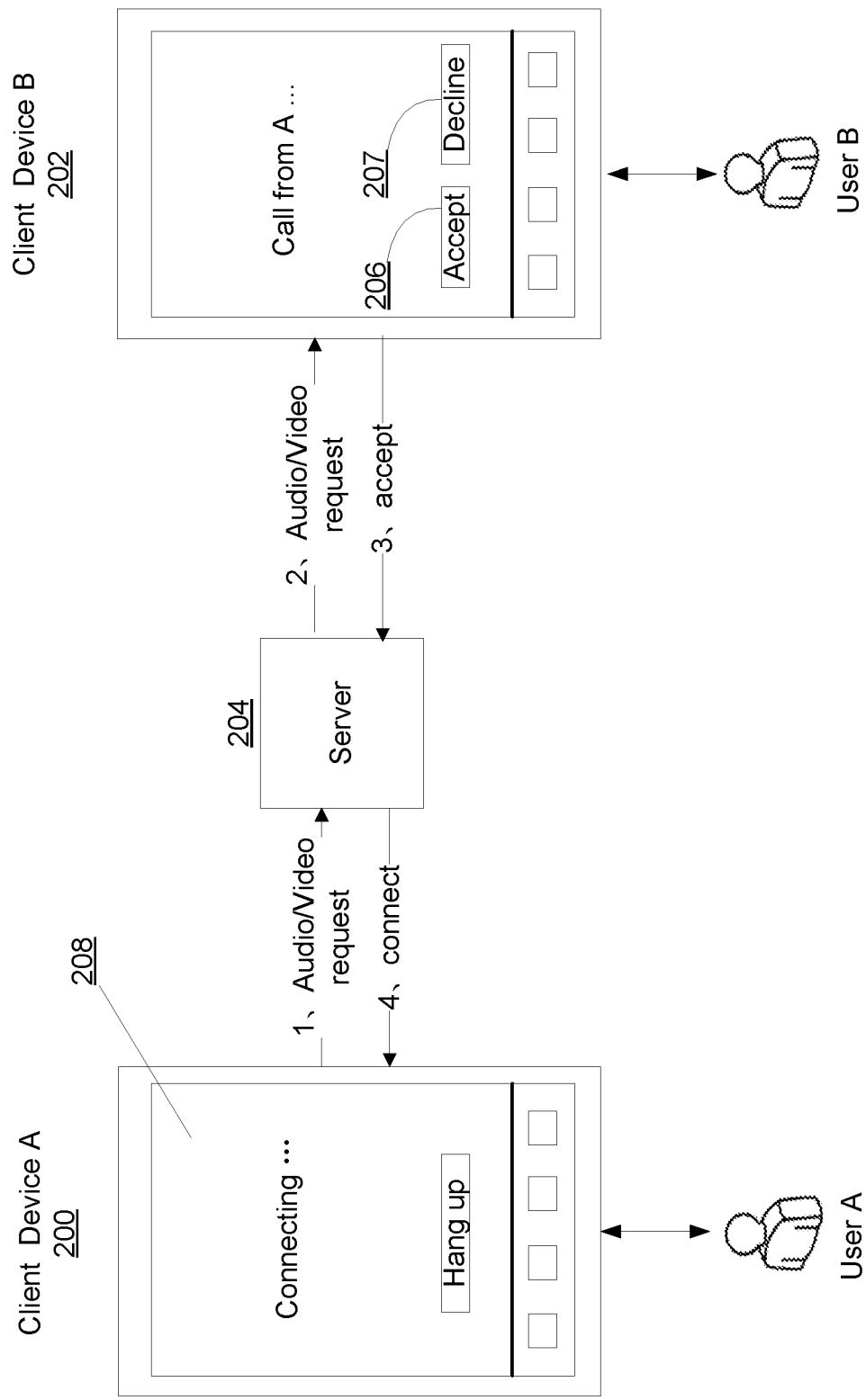
FIGS. 2A-2B are block diagrams illustrating an audio and/or video communication session between a first client device and a second client device established via a server and over the network, in accordance with some embodiments.
Figure 2B:
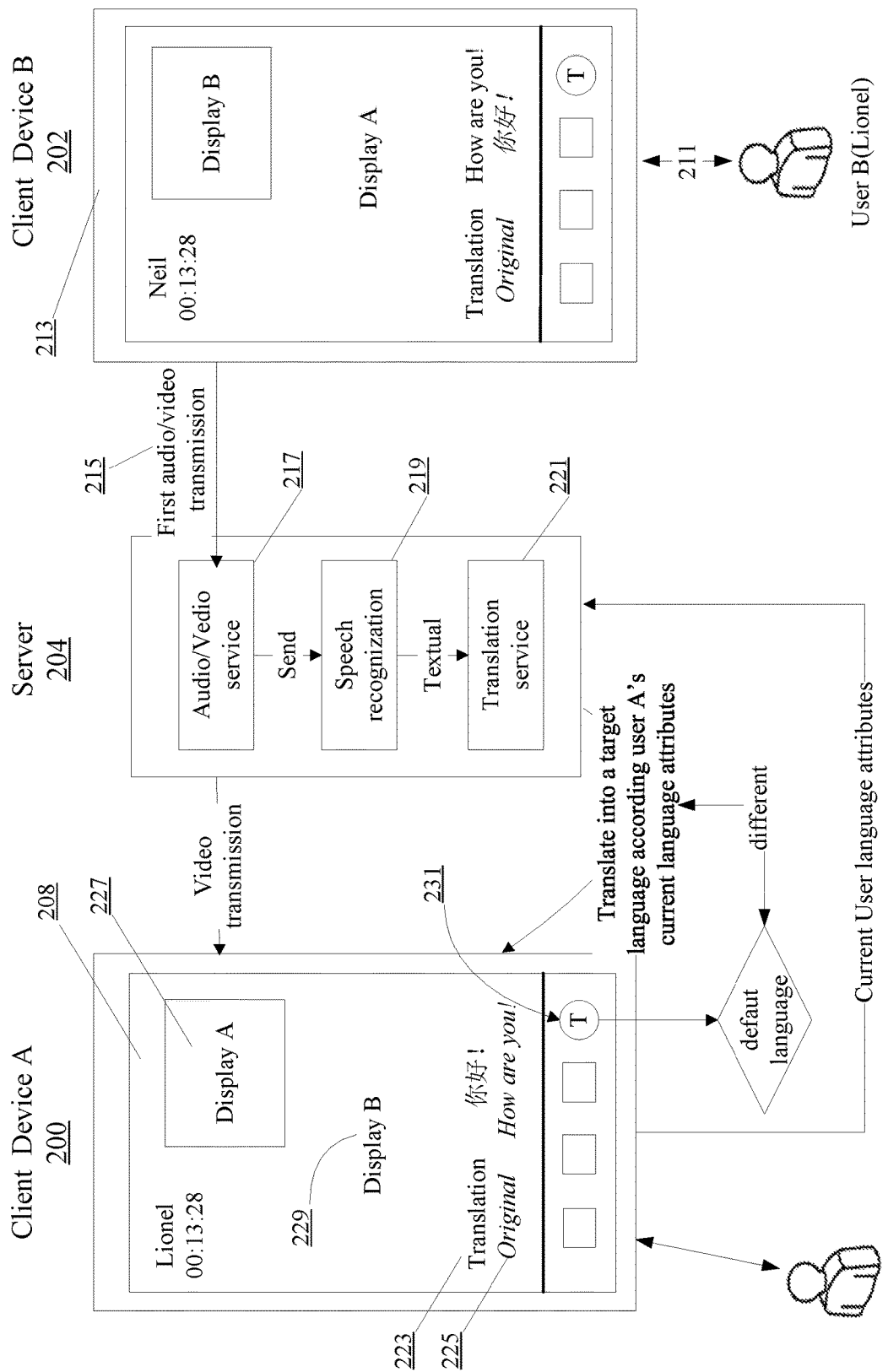

FIGS. 2A-2B are block diagrams illustrating an audio and/or video communication session between a first client device (e.g., client device A) and a second client device (e.g., client device B) established via a server and over the network, in accordance with some embodiments.

As shown in FIG. 2A, in some embodiments, a user A of the client device A 200 (e.g., client device 104-1 in FIG. 1) (e.g., a smart phone or computer) needs to have a conversation via an audio and/or video communication session with the user B of the client device B 202 (e.g., client device 104-2). The client device A sends an audio/video communication request (e.g., via a client-side module 102-1) to the sever 204 (e.g., server system 108). In response to receiving the request, the server transmits the request to the client device B. When the client device B receives the request, a call prompt is optionally displayed on the client device B (e.g., in a user interface of the client-side module 102-2). If user B accepts the call request (e.g., when the "accept" button 206 is selected in the user interface shown on client device B), an indication that the user B has accepted the audio/video communication request sent by the client device A is sent to user A. For example, the client device B sends an accept instruction to the server. When the server received the accept instruction, the server establishes an audio/video communication session that supports audio/video transmission between the client device A to the client device B. In some embodiments, the server provisions the services (e.g., audio/video transmission services, speech-to-text service, translation service, file sharing service, etc.). In some embodiments, if the user B refuses the audio/video communication request (e.g., the "Reject" button 207 is selected), the server terminates the request and sends a response to the client device A indicating that the call request has been declined.

FIG. 2B shows an exemplary audio and/or video communication session between the client device A and the client device B, after the communication session has been established (e.g., in the manner shown in FIG. 2A). Although in the communication session was established by one of the participants (e.g., user A), the example exchange shown in FIG. 2B can be in either direction, with the roles of the two devices reversed.

In one example, firstly the user B, via the client device B, communicates with the user A. The client device B receives a continuous speech input spoken in a first source language from the user B (e.g. the user B says "How are you!" in English) and/or captures the images of the user B (e.g., captures the facial image of the user B via a camera 213 on the client device B) who is in front of the client device B. The client device B transmits the audio and/or video that has been captured as one or more transmissions (e.g., packets, messages, etc.) or a data stream to the client device A (e.g. shown as first audio/video transmission 215) to the server. The first audio/video transmission includes the received continuous speech input from the user B and the captured image stream. In some embodiments, the communication session between the client device A and B is only an audio communication session without the video communication.

In some embodiments, shown in the FIG. 2B, when the server has received the first audio/video transmission sent by an audio/video service module 217 of the client device B, the server sends the first video transmission to the client device A and sends the first audio transmission to a speech recognition service module 219 (e.g., a speech recognition service module provided by the server or a third-party service provider). The speech recognition service module 219 performs speech to text processing on the first audio transmission to generate a text string in the source language and sends the text string in the source language to a translation service module 221 (e.g., a translation module provided by the server or a third-party service provider). The translation service module 221 translates the text string generated from the first video transmission from the source language (e.g., a source language type received from the client device B or otherwise determined by the server) into a text string in a target language (e.g., a target language type received from the client device A or otherwise determined by the server), sends the translation of the text string generated from the first audio transmission, and also, optionally, sends the original first audio transmission and the text string in the source language to the client device A. In some embodiments, the translation is in a textual form. In some embodiments, the translation is adapted to voice form. In some embodiments, both the textual form and the voice form are sent together to the client device A. In some embodiments, the original audio of the first audio transmission is removed and replaced with an audio translation. In some embodiments, the textual translation is added to the original audio transmission as a closed caption. In some embodiments, the text string in the source language is added as a closed caption. When the client device A receives the translation of the first audio transmission and the first audio transmission and the text string in the source language, the client device A presents the translation, and optionally, the text string and the audio in the source language to the user A (e.g., the translation is displayed on the display 208 of the client device A (e.g., shown as the translation "how are you" in Chinese 223 and the source language "how are you" in English 225 displayed on the display screen 208).

In some embodiments, when the client device A and the client device B have established a real-time video communication session over the Internet, there is a small display frame for presenting the graphic of the user A (e.g., shown as 227) on the client device A and a large display frame 229 for presenting the graphic of the user B (e.g., shown as 229) on the client device A. In some embodiments, an indication of the currently identified source language for each of the device is displayed in association with the display frame for the devices. For example, the display frame 227 at the client device A has an indication indicating that Chinese is the currently used source language at the client device A, and the display frame 229 at the client device A has an indication indicating that English is the currently used source language at the client device B.

In some embodiments, there is a default language specified at the client device A. For example, in some embodiments, a default language for the client device A is automatically selected for the client device A by the server or is a preferred language that is already specified by the user A in a language setting of the client device A before the start of the video communication session. For an example, the user A is a Chinese user, and he may pre-specify the default language of his device to be Chinese in the language setting of the client device A. For another example, the default language is specified by the server when the application is set up. In some embodiments, the default language has not been set by the user A or the server by the time that the audio/video communication session is established.

In some embodiments, when the translation service module detects that the source language included in the first audio transmission from the client device B is different from the default language of the client device A, the translation service module or the server obtains one or more user language attributes (e.g., facial features of the user, geolocation information of the client device A, audio message received locally at the client device A, etc.) of the user A from the client device A and translates the speech in the source language into a target language that is determined according to the user language attributes of the client device A. The target language is sometimes different from the default language the is pre-specified for the client device before the communication session is established, and the determination of the target language is based on the real-time gathering of the user language attributes after the communication session is established or while the communication session is being established. For example, the user B using the source language such as English speaks at the client device B, the default language is already specified as Japanese for the client device A by a prior user input in a settings interface. However, the server determines that the current user A may not a Japanese speaker or would not be able to understand Japanese according to the determination of the user language attributes from the client device A. The server instead determines that the user at client device A is a Chinese-speaking user and understands Chinese. Then the translation service module translates the speech received at client device B using English as the source language and Chinese as the target language.

In some embodiments, the client device A obtains the one or more current user language attributes for the client device A by obtaining facial features of the user A at the client device A, and obtaining geolocation information of the client device A. The facial features optionally include ethnic features (e.g., eye color, facial structure, hair color, etc.) that are indicative of an ethnicity or nationality of the user A, or the facial features for determining whether the user A that is currently using the client device A is different from the user that sets up the default language for the client device A. The geolocation information of the first client device optionally includes current location of the client device A and historic location(s) for a preset period of time before the current time, or a pre-stored location of the client device A. For example, in some embodiments, the client device A captures the facial features of the user A who is speaking and/or listening at the client device A, obtains the current geolocation information of the client device A.

In some embodiments, the facial features of the user at the client device A and the geolocation information of the client device A are utilized in combination to suggest the target language (e.g., Chinese) as the current language that is used for the client device A instead of the default language (e.g., Japanese) that is associated with the client device A. For example, the client device A determines based on the facial features that the current user A is Caucasian, and determines that the current location of the client device A is in North America. Based on the combination of the ethnicity and geolocation information, the client device A suggests that the current language used at the client device A may be English, and thus uses English as the target language for translation for the user currently using client device A. In some embodiments, if a default language is already specified for the client device A by a prior user input in a settings interface, the client device A requires that at least one of the currently collected facial features and/or geolocation information indicates that the current user is different from the user that specified the default language for the client device A. In some embodiments, the translation from the source language to the target language is provided to the user at the client device A only after the client device A has received the confirmation that the suggested target language is a correct suggestion.

In some embodiments, the determination of the target language is performed by the server of the communication session, after the client device A collects the facial features and geolocation information and sends the collected information to the server. In some embodiments, the target language is determined based on a data model that is trained on the server, and then stored at the client device A. In some embodiments, before the client device A determines that the target language is to replace the default language as a recognized current language used at the client device A, the client device A presents a request for confirmation from the user at the client device A.

In some embodiments, the client device A determines the target language locally without transmitting the facial features and geolocation information to the server, which helps to protect user privacy and reduce server load.

In some embodiments, the client device A obtains the one or more current user language attributes for the client device A by obtaining an audio input received locally at the client device A during the audio and/or video communication session. The audio input that is received locally at the client device A is analyzed linguistically (e.g., using a linguistic model or a speech model for determining a languages that is spoken) to suggest the target language as the current language that is used at the client device A. For example, the client device A or the sever recognizes the language type of the audio input as English and determines that the current language used at the client device A is English, and the client device A or the sever will suggest that the target language for the client device A is English, as opposed to incorrectly treating the default language that is currently associated with the client device A as the current language used at the client device A.

Figure 3:
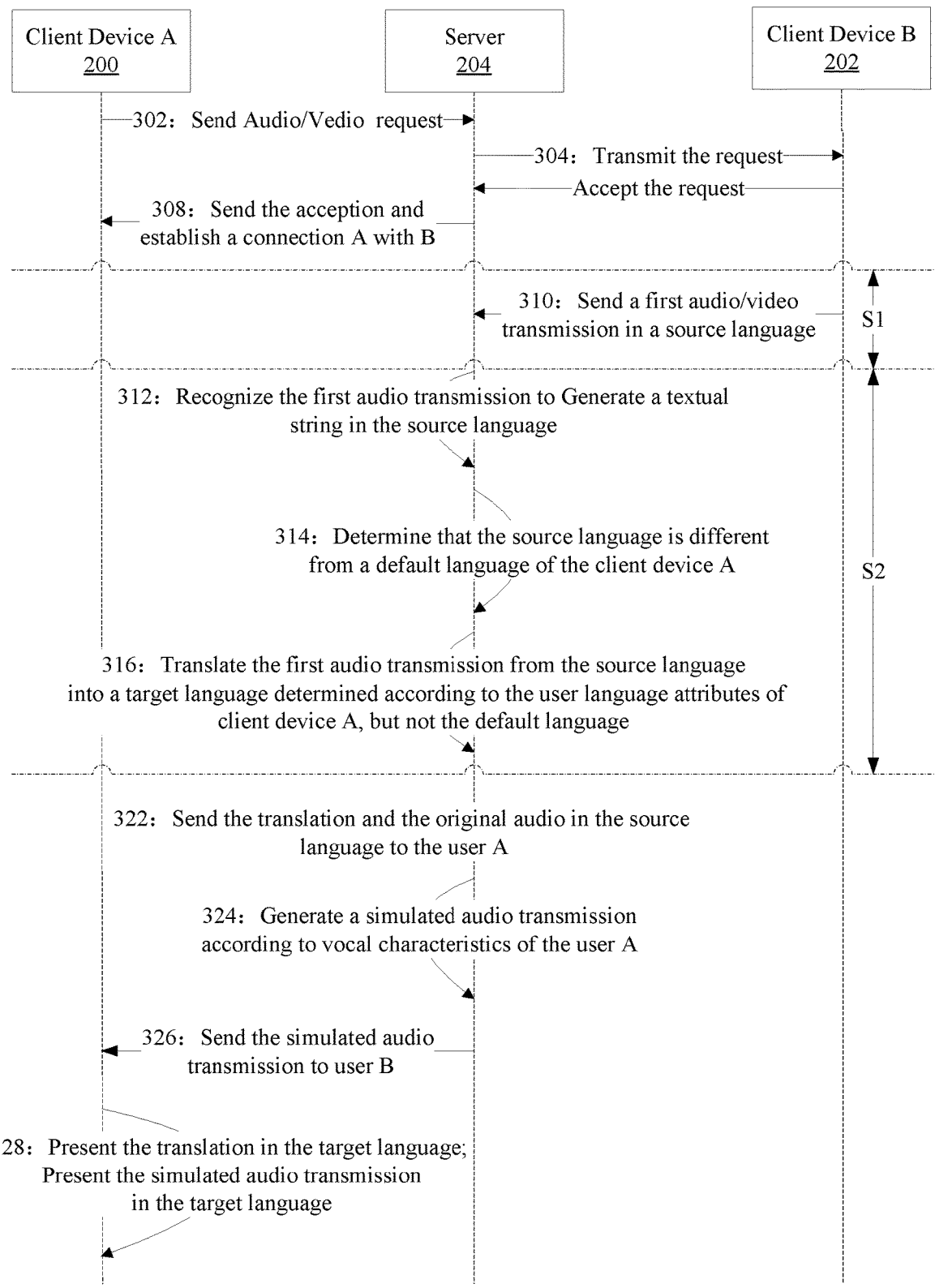
FIGS. 3-5 are communication time sequence charts for the interactions between a first client device, a second client device, and a server during an audio and/or video communication session over a network, in accordance with some embodiments.

FIG. 3 is a communication time sequence chart for the interactions between the client device A establishing an audio and/or video communication session with the second client device B through the server over the network. In some embodiments, firstly the client device A sends an audio/video communication session request to the second client device B through the server (e.g., or directly and not through the server) shown from 302 to 304. When the client device B accepts the request (shown as 306), the server establishes a connection of the audio and/or video communication session between the client device A and the client device B (shown as 308). The steps from 302 to 308 are also described with respect to FIG. 2A.

When the client device B sends the first audio/video transmission spoken in a source language of the user B to the server (shown as 310), the server performs speech-to-text recognition on the first audio transmission in the source language to generate a textual representation in the source language of the client device B (shown as 312). Before the sever translates the textual string in the source language into a textual string in a target language, the server determines whether the source language of the client device B is distinct from the default language which have been automatically selected for the client device A by the server or a preferred language that is already specified by a user in a language setting of the client device A before the start of the video communication session. If the source language is determined to be different from the default language of the client device A (shown as 314), the server translates the first audio transmission from the source language into a target language that is determined according to the current user language attributes (e.g., such described with respect to FIGS. 2A and 2B) of the client device A (shown as 316). In some embodiments, if the source language of client device B is the same as the default language of the client device A, the server will not perform any translation.

After the server has completed the translation of the first audio transmission from the source language to the target language, the server sends textual representations of the translation of the first audio transmission and the original audio in the source language to the client device A (shown as 322). The client device A receives the textual representations of the translation of the first audio transmission and the original audio in the source language and presents the textual representations on the display (such as shown 223 and 225 in FIG. 2B).

In some embodiments, the server generates a simulated first audio transmission in accordance with the vocal characteristics of the user B that includes the translation of the first audio transmission, and sends the simulated first audio transmission to the client device A (shown as 324 and 326). For example, the server obtains the vocal characteristics of a voice in the first audio transmission. The vocal characteristics optionally include a voiceprint, or a predefined set of characteristics such as frequencies, tone, pitch, duration, amplitude, etc. of a person's voice. In some embodiments, the simulated first audio transmission is generated using a generic voice of a man, a woman, or a child, depending on whether the vocal characteristics obtained from the first audio transmission indicate that the original first audio transmission was spoken by a man, a woman, or a child. In some embodiments, the simulated first audio transmission closely mimics the voice of the original first audio transmission.

In some embodiments, the server automatically switches between using generic voices or specially simulated voices to speak the translation depending on server load (e.g., processing power, memory, and network bandwidth), and the rates by which the audio transmissions are being received at the client devices. For example, when the server load is above a predefined threshold, the simulated first audio transmission is provided in a voice that is generated in accordance with a small subset of the vocal characteristics (e.g., the primary frequencies and pitches only) of the original first audio transmission; and when server load is below the predefined threshold, the simulated first audio transmission is provided in a voice that is generated in accordance with a larger subset of the vocal characteristics (e.g., a wider range of frequencies, pitches, amplitudes, etc.) of the original first audio transmission.

In some embodiments, after received the simulated first audio transmission, the client device A presents the textual representation of the translation on the display and output the simulated first audio transmission for the user A at the client device A. For example, the simulated first audio transmission in the target language is played in lieu of the original first audio transmission in the source language at the client device A. In some embodiments, playback of a segment of the video transmission at the client device A is delayed such that the video transmission received from the second client device is synchronized with playback of the simulated first audio transmission at the client device A.

Figure 4:
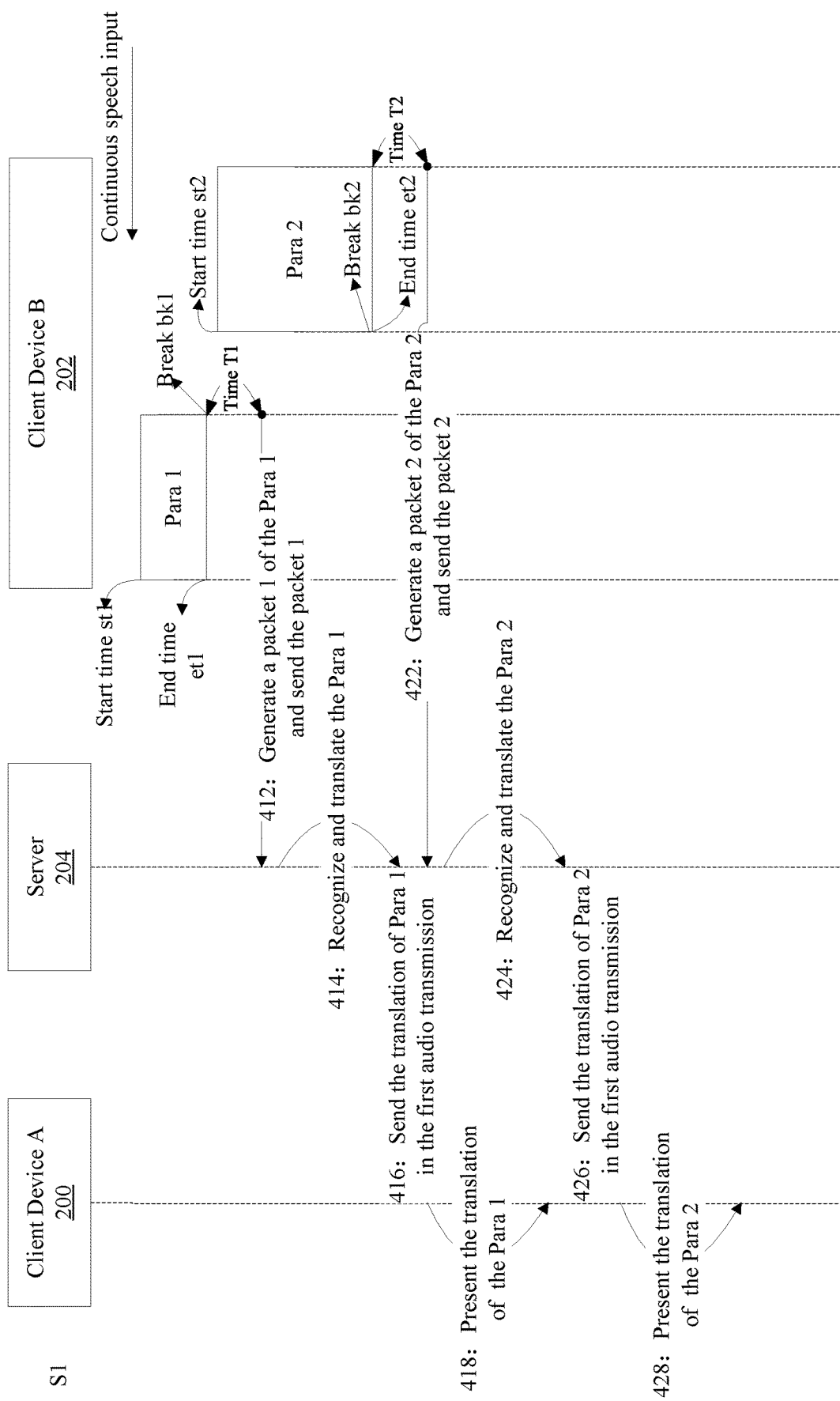

FIG. 4 is an example of the processing occurring at the client device B when sending audio transmissions to the client device A.

In some embodiments, when the user B speaks at the client device B (e.g., as shown in FIG. 2B), the client device B detects continuous speech input from the user B located at the client device B and marks a first start time (e.g. the start time st1 in FIG. 4) of the continuous speech input as a beginning of a first audio paragraph detected at the client device B. When the client device B detects a first predefined break (e.g. break bk1 in FIG. 4) in the continuous speech input, the client device marks a first end time (e.g. the end time et1 in FIG. 4) of the first predefined break bk1 as an end of the first audio paragraph. In some embodiments, the continuous speech input is defined as a continuous voice input stream that includes only short breaks of less than a predefined speech input termination time threshold. The continuous speech input is considered terminated when no voice input is detected for more than the speech input termination time threshold. The speech input termination time threshold is longer than the predefined time threshold for identifying breaks in the continuous speech input; and the time threshold for detecting breaks in the continuous speech input is longer than the estimated natural pauses between words of a sentence, or between two clauses of a sentence.

In some embodiments, after detecting the first predefined break bk1 in the continuous speech input, the client B converts the first audio paragraph into a first audio packet and sends the first audio packet to the server (shown as 412). Then the server performs speech to text recognition on the first audio packet and translates the first audio paragraph from the source language into the target language (shown as 414). The server sends the translation of the first audio paragraph to the client device A for presenting the translation at the client device A (shown as 416 and 418). In some embodiments, an audio package is a segment of audio input stream that is encoded and compressed according to a predefined format, such as a RAR (Roshal ARchive) file.

In some embodiments, while generating the first audio packet and sending the first audio packet (at the step 412), the client device B continues to detect the continuous speech input from the user located at the client device B. At least a portion of the continuous speech input that is detected while generating and sending the first audio packet is included in the first audio transmission as a second portion of the first audio transmission. For example, when continuing to detecting the continuous speech input, the client device B detects a second predefined break (e.g., the break bk2 in FIG. 4 at the end of the second audio paragraph para2) in the continuous speech input at the client device B. The client device B marks the end time of the first predefined break bk1 as a second start time (e.g., the start time st2 in FIG. 4 for the para2) of a second audio paragraph and marks a second end time (e.g., the end time et2 in FIG. 4 for the para 2) of the second predefined break as an end of the second audio paragraph detected at the client device B. The client device B generates a second audio packet to include the second audio paragraph, and sends the second audio packet to the client device A (e.g., shown from 422 to 428 in FIG. 4).

The above process continuous and more audio paragraphs are detected in the continuous speech input, each audio paragraph being marked with a respective start timestamp (and optionally, a respective end timestamp), converted into a respective audio packet, and sent to the client device A sequentially according to the respective start timestamps thereof, as long as the termination of the continuous speech input has not been detected. Thus, two or more audio paragraphs including the first audio paragraph and the second audio paragraph are translated from the source language of the first audio transmission to the target language determined for the client device A for presentation at the client device A. For example, the first audio transmission includes one or more sentences received in separate audio packets that arrive separately at the server with different headers and timestamps, each of which is translated separately from the source language of the first audio transmission to the target language determined for the client device A and the translations are presented at the client device A.

In some embodiments, while capturing the continuous speech input at the client device B, the client device B continuously captures video using a camera at the client device B and marks the continuously captured video with the respective start timestamps (and optionally, the respective end timestamps) of the two or more audio paragraphs, wherein the respective start timestamps (and, optionally the respective end timestamps) are used by the client device A (or the server) to synchronize presentation of the video and respective translations of the two or more audio paragraphs at the client device A.

Figure 5:
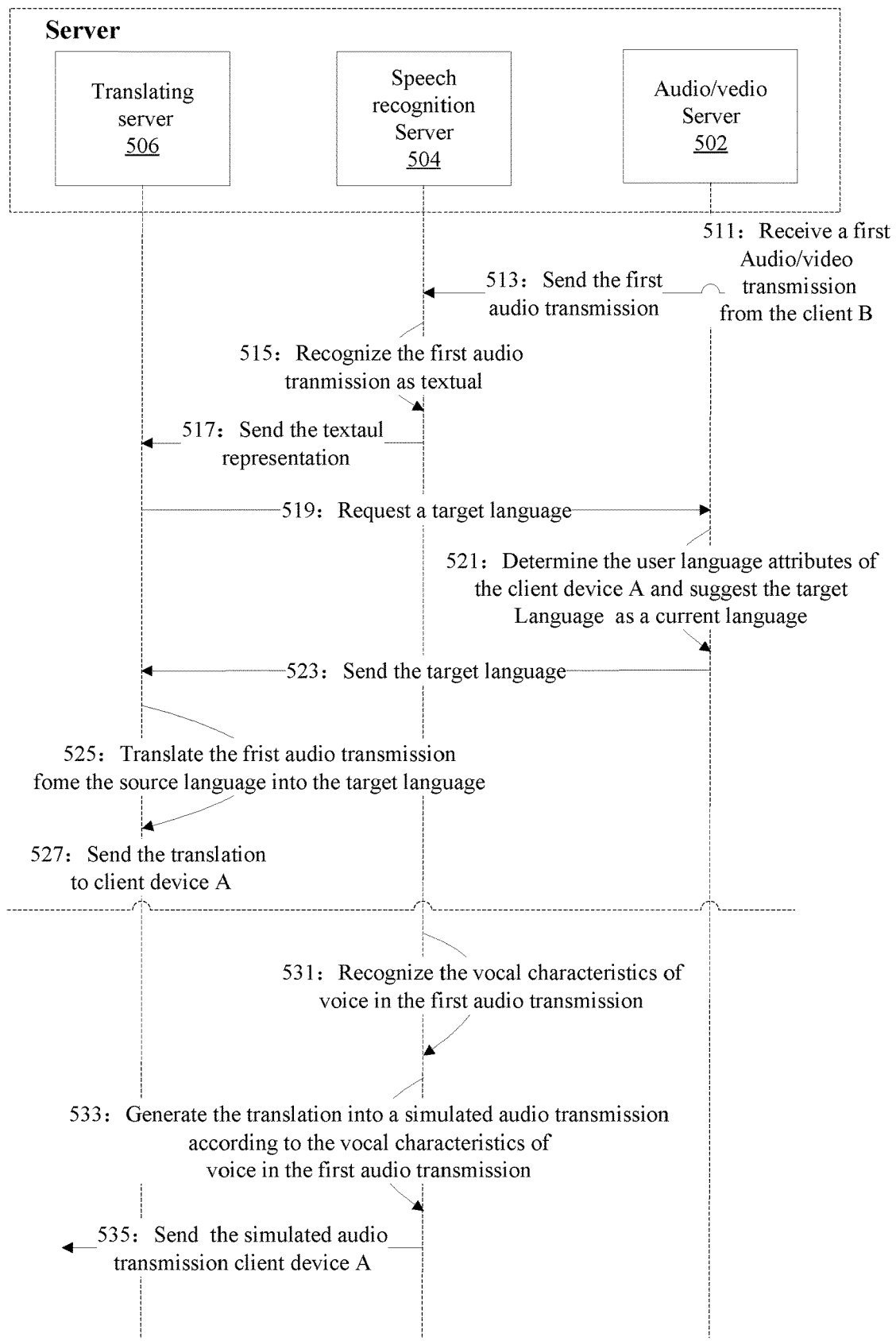
Figure 6A:
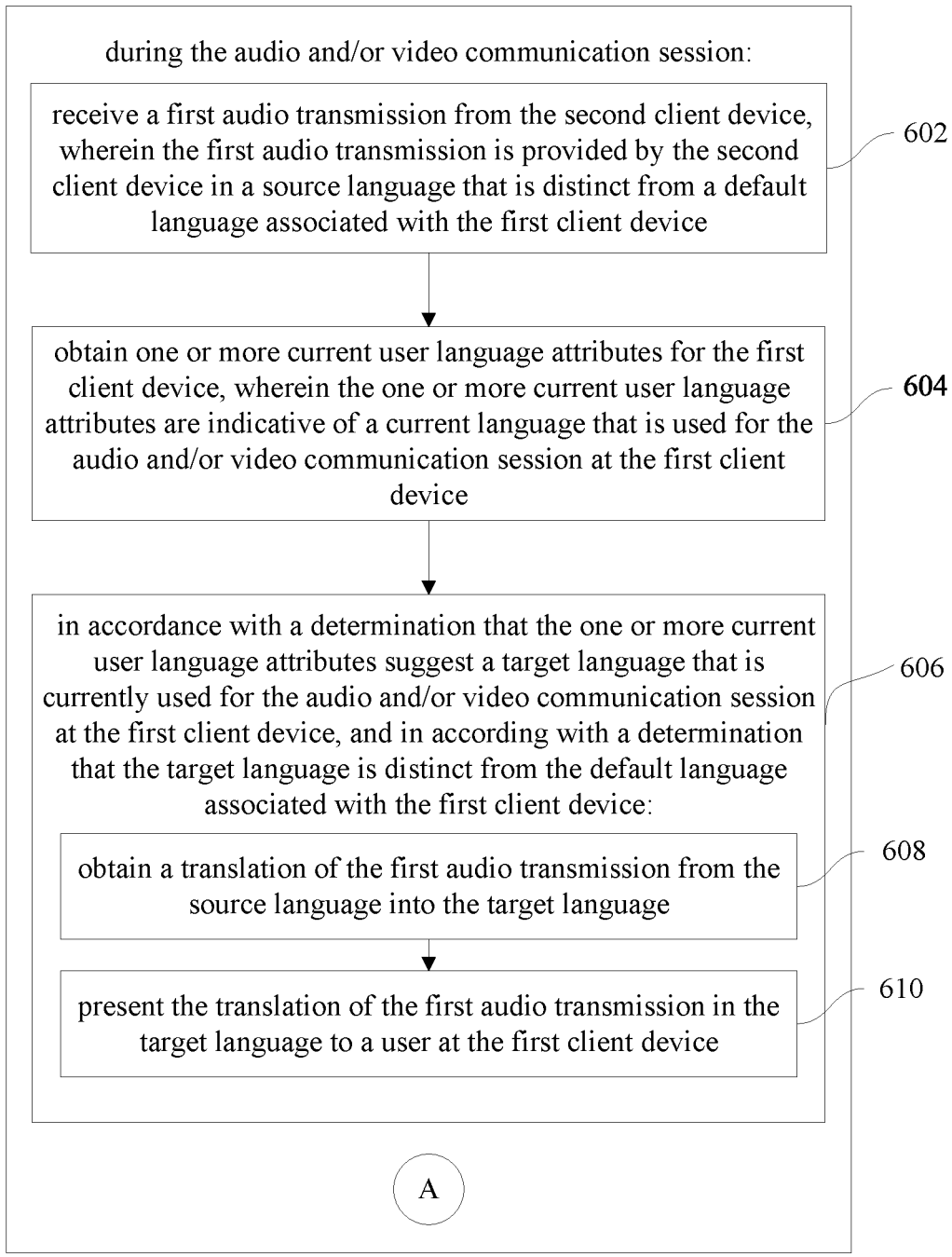
Figure 6C:
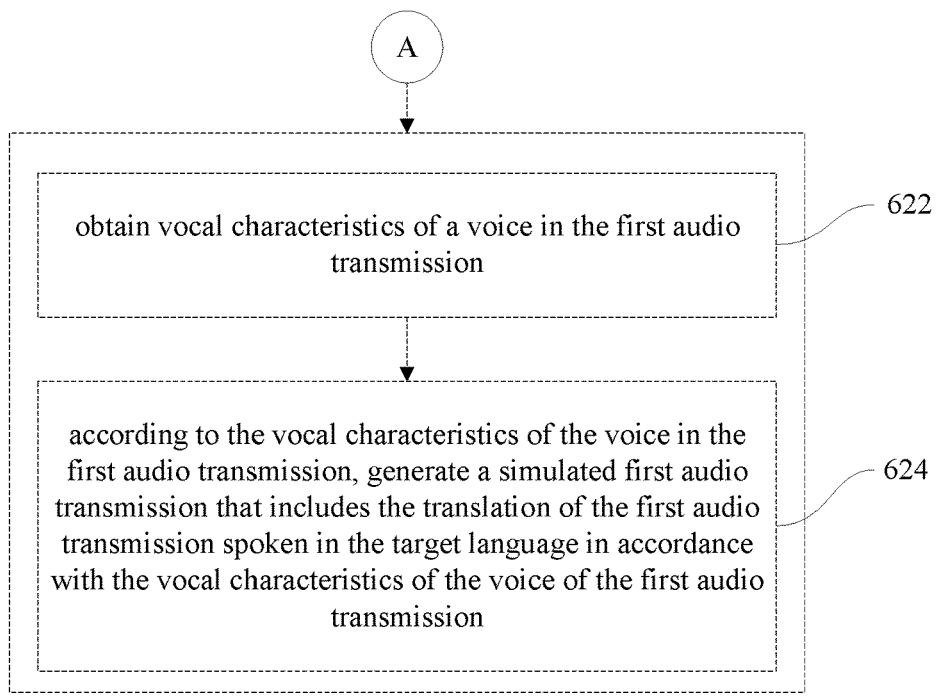
Figure 6D:
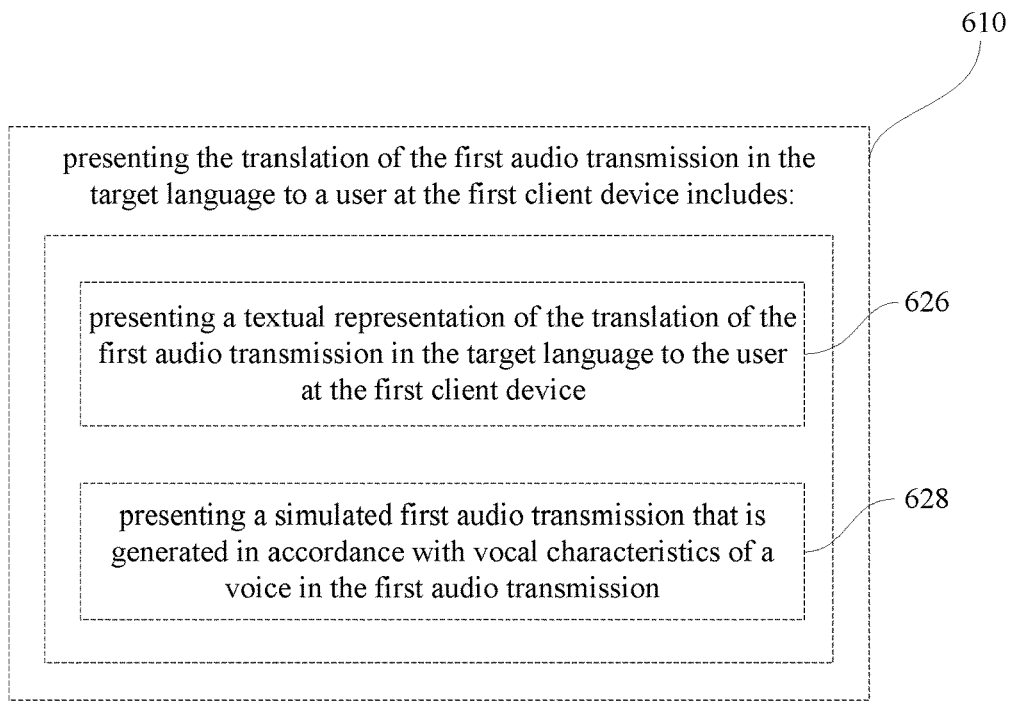
Figure 6E:
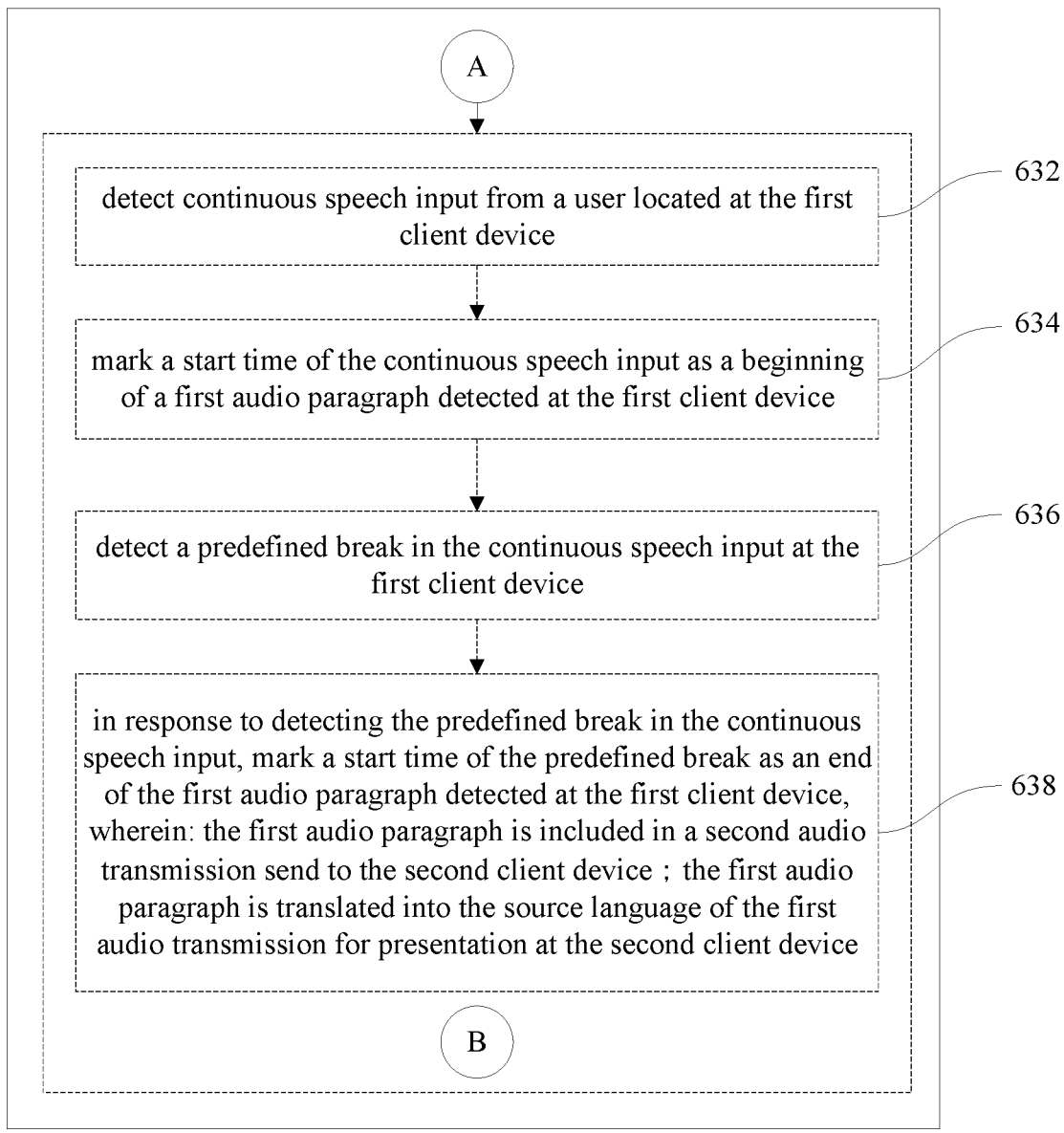
Figure 6F:
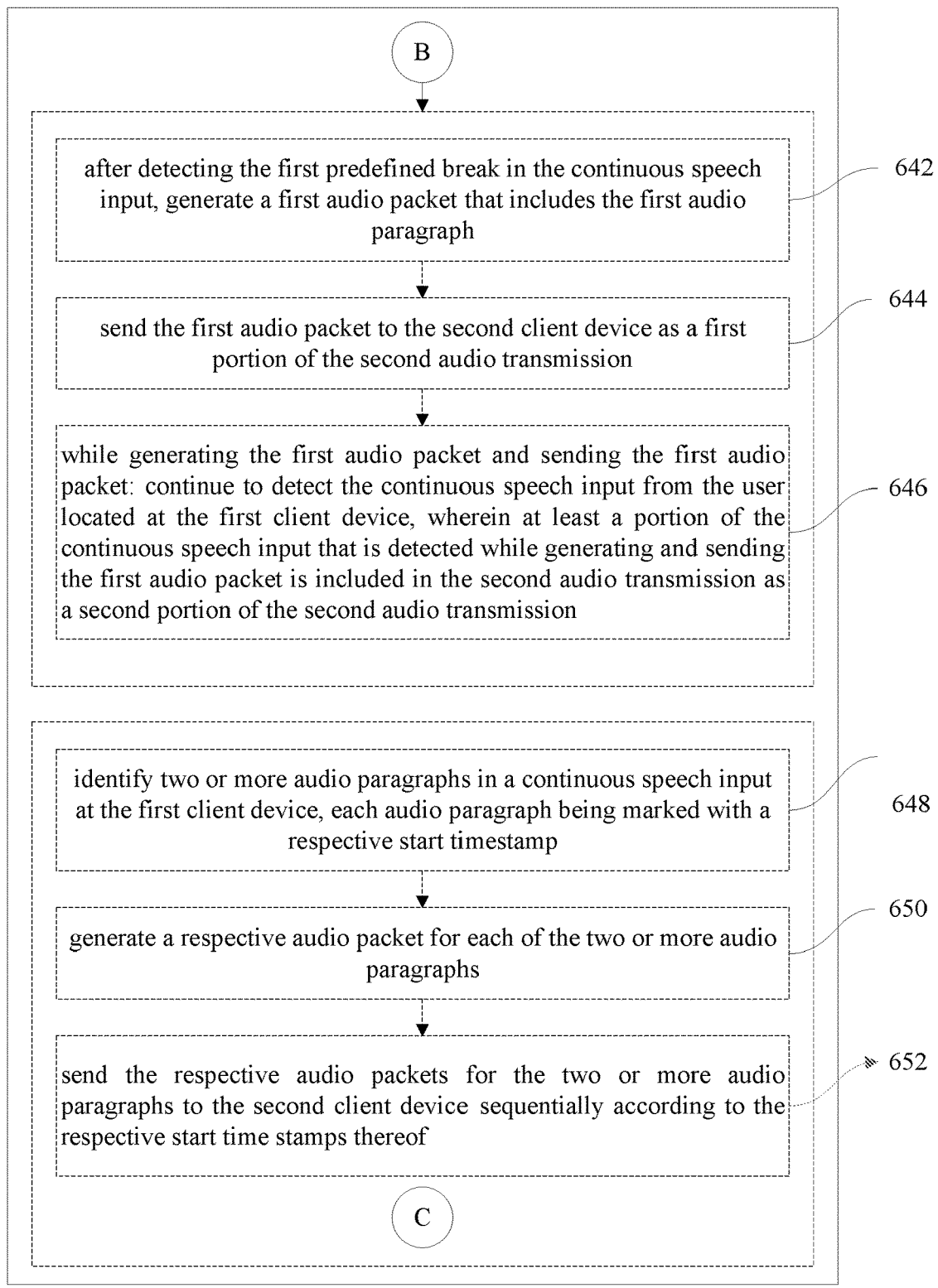
Figure 6G:
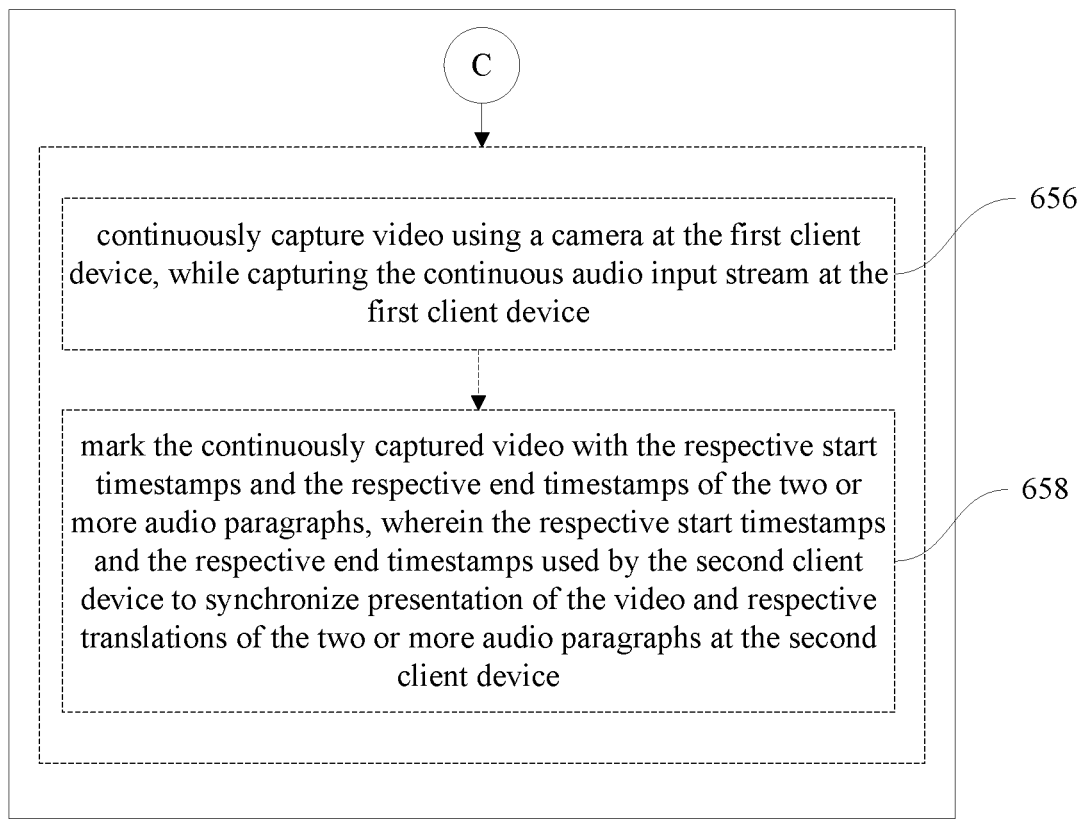
Figure 7A:
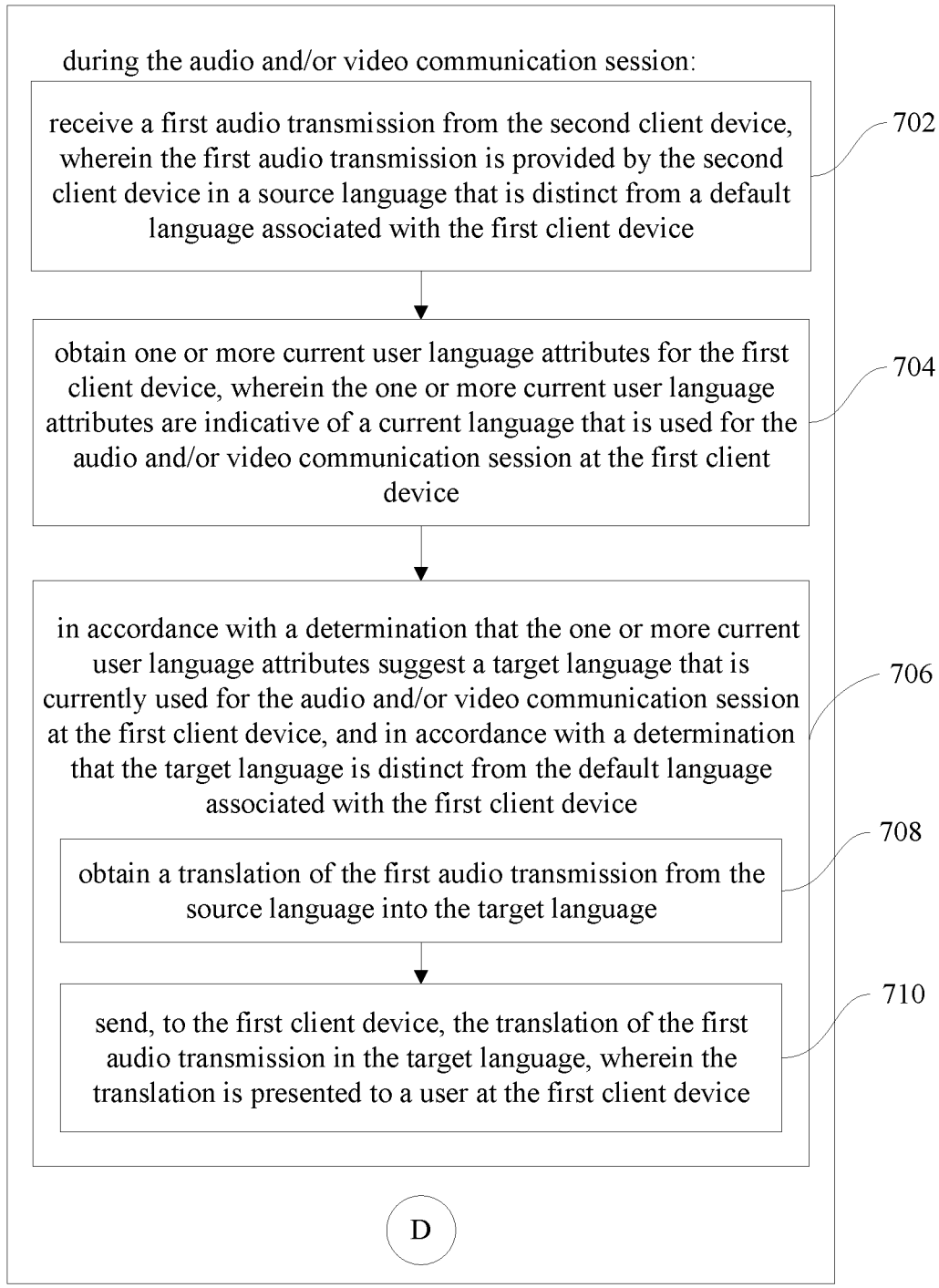
Figure 7B:
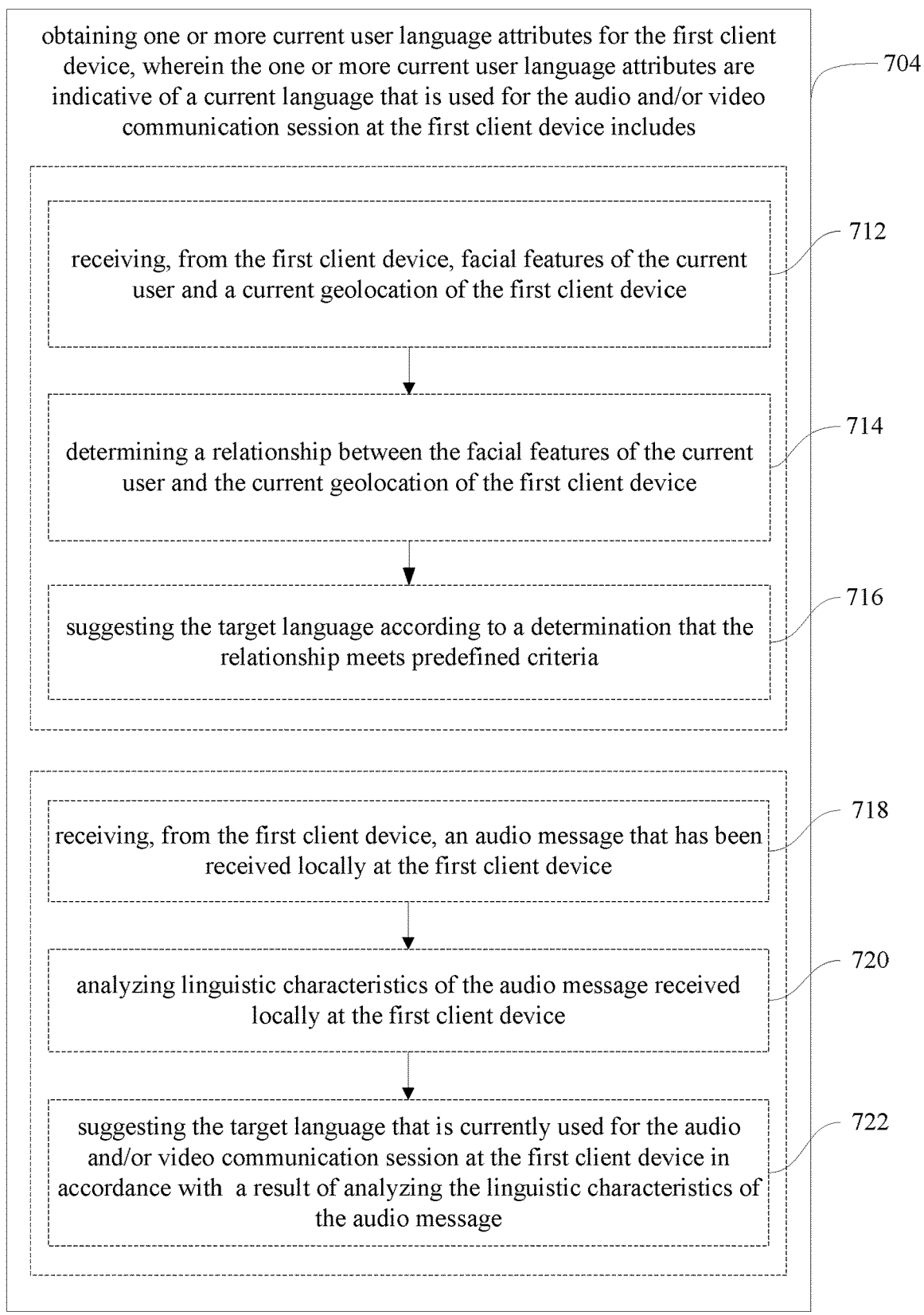
Figure 7C:
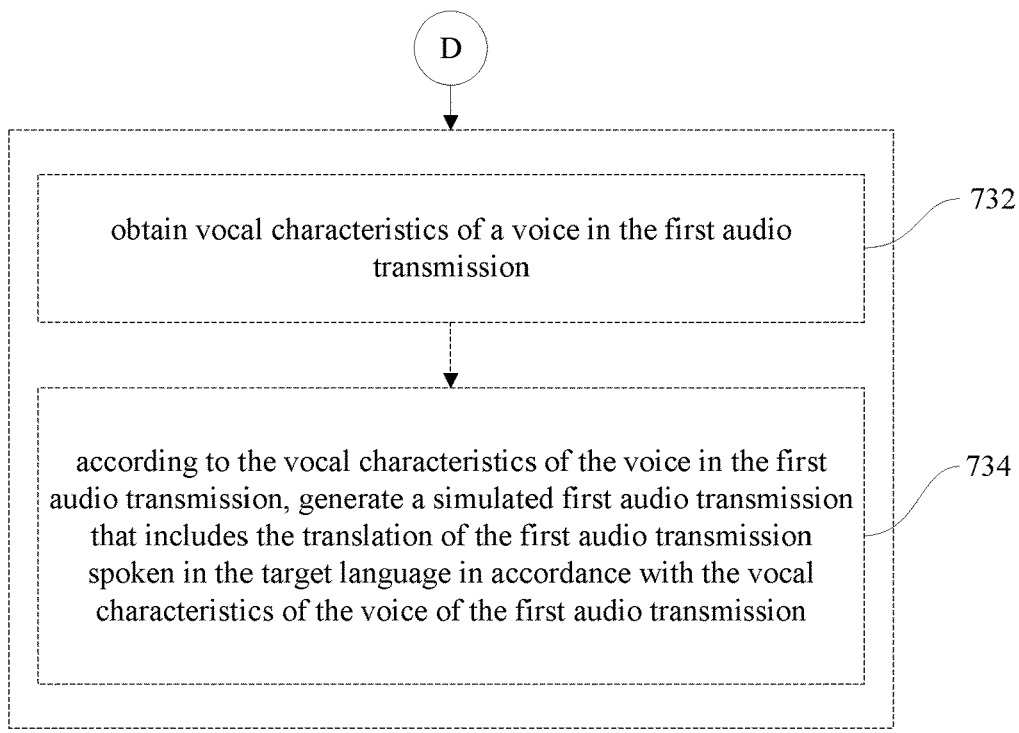
Figure 7D:
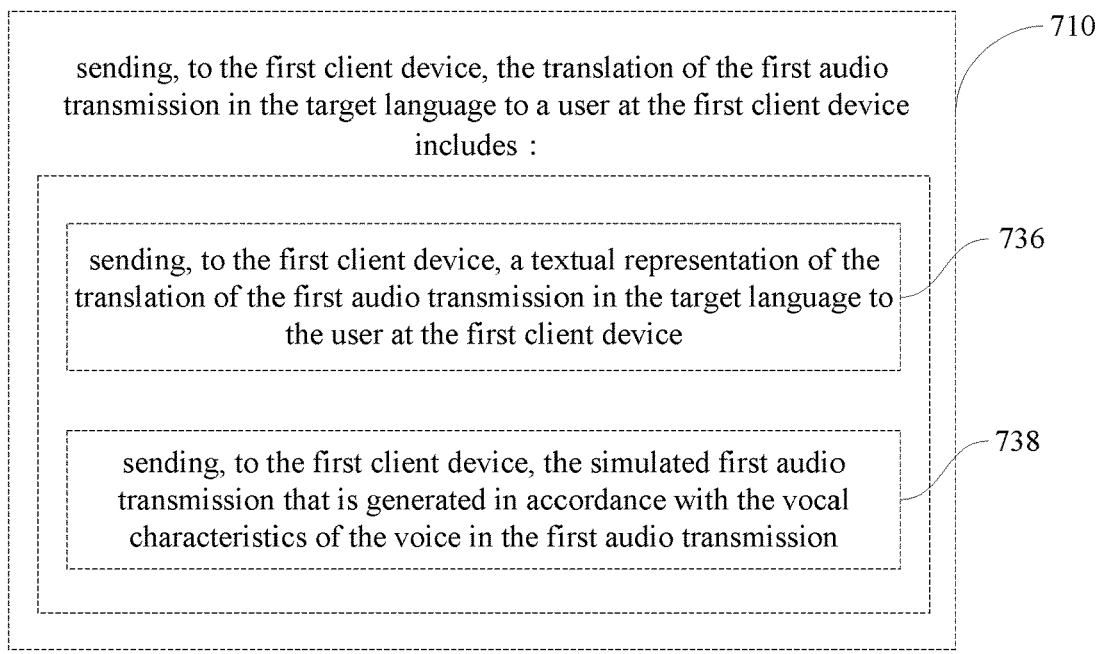
Figure 7F:
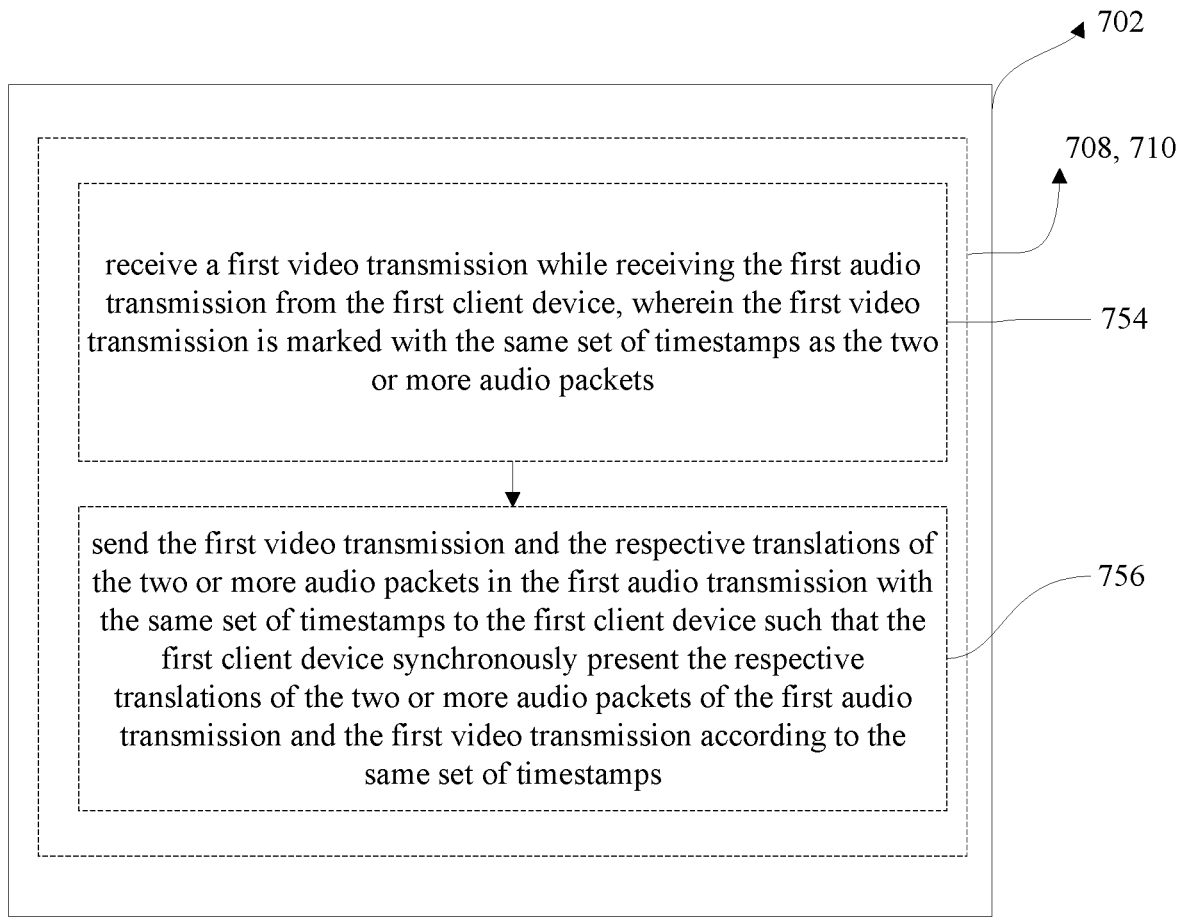

FIG. 5 is a time sequence chart of an example server-side processing during the audio and/or video communication session between the client device A and the client device B over the network. The server 204 includes an audio/video server 502, a speech recognition server 504 and a translating server 506, in some embodiments. In some embodiments, the servers 502, 504, and 506 are replaced by submodules of the server 204 that provide the functions.

In some embodiments, during the audio and/or video communication session, the audio/video server receives a first audio/video transmission in a source language spoken by the user B from the client device B (shown as 511) and sends the first audio transmission to the speech recognition server (shown as 513). The speech recognition server recognizes the first audio transmission and generates a textual representation in the source language (shown as 515) in accordance with a speech recognition library or a language model stored at the speech recognition server, and sends the textual representation in the source language to the translating server (shown as 517) for preparing to translate the textual representation from the source language to a target language that has been determined for the client device A. Then the translating server sends a target language request to the audio/video server (shown as 519) for determining whether the transmission needs to be translated, and if so, to what target language (e.g., determining whether the source language is the same as the target language or the default language).

The audio/video server determines the user language attributes from the client device A and suggests a target language as a current language that is used at the client device A (shown as 521). In some embodiments, the audio/video server receives the facial features of the current user at client device A and a current geolocation of the client device A, and determines a relationship between the facial features of the current user and the current geolocation of the client device A (e.g., whether the facial features suggest an ethnicity or nationality that is sufficiently correlated (e.g., in accordance with predefined criteria) with the current geolocation of the first client device). According to a determination that the relationship meets predefined criteria, the audio/video server suggests the target language. For example, if the facial feature and the geolocation are both correlated with the same language, then that language is suggested as the target language. In some embodiments, the audio/video server receives an audio message (e.g., an oral instruction from the user at the client device A or a speech input received from the user A as part of the audio/video communication session) that has been received locally at the client device A and analyzes linguistic characteristics of the audio message. Then according to a result of analyzing the linguistic characteristics of the audio message, the audio/video server may suggest a target language for use by the translating server.

The audio/video server sends the suggested target language to the translating server (shown as 523). Then the translating server translates the first audio transmission from the source language into the target language suggested by the audio/video server and sends the translation of the first audio transmission to the client device A for presenting the result of the translation at the client device A (e.g., both the textual representation and the audible representation of the translation is provided at the first client device).

In some embodiments, the speech recognition server recognizes the vocal characteristics of a voice in the first audio transmission (shown as 531) and generates a simulated first audio transmission according to the vocal characteristics of a voice in the first audio transmission (shown as 533) and the translation of the first audio transmission. The vocal characteristics may include a voiceprint, or a predefined set of characteristics such as frequencies, tone, pitch, duration, amplitude, etc. of a person's voice. After the simulated first audio transmission generated by the speech recognition server, the speech recognition server sends the simulated first audio transmission to the client device A (shown as 535) for presenting with the translation of the simulated first audio transmission.

FIGS. 6A-6G illustrate a flowchart diagram of a method 600 of providing audio communication session between two or more client devices. In some embodiments, method 600 is performed by a first client device, in conjunction with a server, or independently of a server. For example, in some embodiments, method 600 is performed by client device 104-1 (e.g., client-side module 102-1), in conjunction with server system 108 (FIGS. 1-2) or a component thereof (e.g., server-side module 106, FIGS. 1-2). In some embodiments, method 600 is governed by instructions that are stored in a non-transitory computer readable storage medium and the instructions are executed by one or more processors of the client and server systems. Optional operations are indicated by dashed lines (e.g., boxes with dashed-line borders).

In method 600 of processing audio communications over a network, the first client device has established an audio and/or video communication session with a second client device over the network (e.g., a user of the first device and a user of the second device have established a real-time video conference over the Internet through a server of an online teleconference service provider). During the audio and/or video communication session: the first client device receives (602) a first audio transmission from the second client device (e.g., through a server of the video conference service), wherein the first audio transmission is provided by the second client device in a source language that is distinct from a default language associated with the first client device (e.g., a default language that is automatically selected for the first client device by the server or a preferred language that is already specified by a user in a language setting of the first client device before the start of the video communication session). The first client device obtains (604) one or more current user language attributes (e.g., facial features of the user, geolocation information, audio message received locally, etc.) for the first client device, wherein the one or more current user language attributes are indicative of a current language that is used for the audio and/or video communication session at the first client device. In accordance with a determination that the one or more current user language attributes suggest a target language that is currently used for the audio and/or video communication session at the first client device, and in accordance with a determination that the target language is distinct from the default language associated with the first client device (606): the first client device obtains (608) a translation of the first audio transmission from the source language from the source language into the target language; and the first client device presents (610) the translation of the first audio transmission in the target language to a user at the first client device. For example, in some embodiments, the target language is suggested by the first client device. In some embodiments, the target language is suggested by the server. In some embodiments, the first client device determines whether or not the target language is the same as the default language associated with the first client device. In some embodiments, the server makes the determination regarding whether the target language is the same as the default language associated with the first client device. In some embodiments, the translation of the first audio transmission in the target language is presented as a textual output at the first client device. In some embodiments, the translation of the first audio transmission is provided as an audio output at the first client device. In some embodiments, both the textual representation and the audible representation of the translation is provided at the first client device (e.g., synchronized to a portion the video that corresponds to the first audio transmission).

In some embodiments, obtaining the one or more current user language attributes for the first client device (e.g., step 604) includes (612) obtaining facial features of the user at the first client device (e.g., obtaining ethnic features (e.g., eye color, facial structure, hair color, etc.) that are indicative of an ethnicity or nationality of the user, or obtaining facial features for determining whether the user that is currently using the first client device is different from the user that sets up the default language for the first client device) and obtaining geolocation information of the first client device (e.g., including current location of the first client device and historic location(s) for a preset period of time, or a pre-stored location of the first client device). The facial features of the user at the first client device and the geolocation information of the first client device are utilized in combination (614) to suggest the target language as the current language that is used for the first client device instead of the default language that is associated with the first client device. For example, in some embodiments, the first client device captures the facial features of the current user who is speaking and/or listening at the first client device, obtains the current geolocation information of the first client device. In some embodiments, the first client device determines based on the facial features that the current user may be Caucasian, and determines that the current location of the first client device is in North America. Based on the combination of the ethnicity and geolocation information, the first client device suggests that the current language used at the first client device may be English. In some embodiments, if a default language is already specified for the first client device by a prior user input in a settings interface, the first client device requires that at least one of the currently collected facial features and/or geolocation information indicates that the current user is different from the user that specified the default language for the first client device. In some embodiments, the determination of the target language is performed by the server of the communication session, after the first client device collects the facial features and geolocation information and sends the collected information to the server. In some embodiments, the first client device determines the target language locally without transmitting the facial features and geolocation information to the server, which helps to protect user privacy and reduce server load. In some embodiments, the target language is determined based on a data model that is trained on the server, and then stored at the first client device. In some embodiments, before the first client device determines that the target language is to replace the default language as a recognized current language used at the first client device, the first client device presents a request for confirmation from the user at the first client device. In some embodiments, the translation from the source language to the target language is provided to the user at the first client device only after the first client device has received the confirmation that the suggested target language is a correct suggestion.

In some embodiments, obtaining the one or more current user language attributes for the first client device (e.g., step 604) includes (616) obtaining an audio input received locally at the first client device during the audio and/or video communication session. The audio input that is received locally at the first client device is analyzed linguistically (618) (e.g., using a linguistic model or a speech model for determining a languages that is spoken) to suggest the target language as the current language that is used at the first client device. For example, in some embodiments, the first client device or the sever recognizes the language type of the audio input as English and determines that the current language used at the first client device is English, and the first client device or the sever will suggest that the target language for the first client device is English, as opposed to incorrectly treating the default language that is currently associated with the first client device as the current language used at the first client device.

In some embodiments, the first client device obtains (622) vocal characteristics (e.g., a voiceprint, or a predefined set of characteristics such as frequencies, tone, pitch, duration, amplitude, etc. of a person's voice) of a voice in the first audio transmission; and the first client device, according to the vocal characteristics of the voice in the first audio transmission, generates (624) a simulated first audio transmission that includes the translation of the first audio transmission spoken in the target language in accordance with the vocal characteristics of the voice of the first audio transmission. For example, in some embodiments, the simulated first audio transmission is generated using a generic voice of a man, a woman, or a child, depending on whether the vocal characteristics obtained from the first audio transmission indicate that the original first audio transmission was spoken by a man, a woman, or a child. In some embodiments, the simulated first audio transmission closely mimics the voice of the original first audio transmission. In some embodiments, the system (e.g., the server) automatically switches between using generic voices or specially simulated voices to speak the translation depending on server load (e.g., processing power, memory, and network bandwidth), and the rate by which the audio transmissions are being received at the first client device. For example, when the server load is above a predefined threshold, the simulated first audio transmission is provided in a voice that is generated in accordance with a small subset of the vocal characteristics of the original first audio transmission; and when server load is below the predefined threshold, the simulated first audio transmission is provided in a voice that is generated in accordance with a larger subset of the vocal characteristics of the original first audio transmission.

In some embodiments, presenting the translation of the first audio transmission in the target language to a user at the first client device (e.g., step 610) includes: presenting (626) a textual representation of the translation of the first audio transmission in the target language to the user at the first client device; and presenting (628) a simulated first audio transmission that is generated in accordance with vocal characteristics of a voice in the first audio transmission (e.g., the simulated first audio transmission in the target language is played in lieu of the original first audio transmission in the source language at the first client device). In some embodiments, playback of a segment of the video transmission at the first client device is delayed such that the video transmission received from the second client device is synchronized with playback of the simulated first audio transmission at the first client device.

In some embodiments, during the audio and/or video communication session: the first client device detects (632) continuous speech input (e.g., a continuous speech input is defined as a continuous voice input stream that includes only short breaks of less than a predefined speech input termination time threshold. A continuous speech input is considered termination when no voice input is detected for more than the speech input termination time threshold. The speech input termination time threshold is longer than the predefined time threshold for identifying breaks in the continuous speech input; and the time threshold for detecting breaks in the continuous speech input is longer than the estimated natural pauses between words of a sentence, or between two clauses of a sentence) from a user located at the first client device. The first client device marks (634) a start time of the first continuous speech input as a beginning of a first audio paragraph detected at the first client device. The first client device detects (636) a first predefined break in the continuous speech input at the first client device (e.g., detecting an absence of a sufficient level of speech input in the continuous audio input stream at the first client device for at least a threshold amount of time). In response to detecting the first predefined break in the continuous speech input, the first client device marks a start time of the first predefined break as an end of the first audio paragraph detected at the first client device, wherein the first audio paragraph is included in a second audio transmission that is sent to the second client device.

In some embodiments, after detecting the first predefined break in the continuous speech input, the first client device generates (642) a first audio packet that includes the first audio paragraph. The first client device sends (644) the first audio packet to the second client device as a first portion of the second audio transmission. While generating the first audio packet and sending the first audio packet: the first client device continues (646) to detect the continuous speech input from the user located at the first client device, wherein at least a portion of the continuous speech input that is detected while generating and sending the first audio packet is included in the second audio transmission as a second portion of the second audio transmission. For example, when continuing the detect the continuous speech input, the first client device detects a second predefined break in the continuous speech input at the first client device. The first client device marks the end time of the first predefined break as a start time of a second paragraph and marks a start time of the second predefined break as an end of the second audio paragraph detected at the first client device. The first client device generates a second audio packet to include the second audio paragraph, and sends the second audio packet to the second client device. The above process continuous and more audio paragraphs are detected, converted into audio packets, and sent to the second client device, as long as the termination of the continuous speech input has not been detected. In some embodiments, two or more audio paragraphs including the first audio paragraph and the second audio paragraph are translated into the source language of the first audio transmission for presentation at the second client device. For example, the second audio transmission include one or more sentences received in separate audio packets that arrive separately at the server with different headers and timestamps, each of which is translated separately into the source language of the first audio transmission and the translations are presented at the second client device.

In some embodiments, during the audio and/or video communication session: the first client device identifies (648) two or more audio paragraphs in a continuous speech input (e.g., a continuous voice input stream) at the first client device, each audio paragraph being marked with a respective start timestamp (and optionally, a respective end timestamp); the first client device generates (650) a respective audio packet for each of the two or more audio paragraphs (e.g. an audio package is a segment of audio input stream that is encoded and compressed according to a predefined format, such as a RAR (Roshal ARchive) file); and the first client device sends the respective audio packets for the two or more audio paragraphs to the second client device (e.g., through the server or directly) sequentially according to the respective start time stamps thereof. In some embodiments, the audio packets are sent to the server responsible for translating the audio paragraphs, without being sent to the second client device. In some embodiments, the transmission of the audio packets (e.g., as separate and discrete files) are independent of the transmission (e.g., by continuous streaming) of the audio continuously captured at the first client device.

In some embodiments, during the audio and/or video communication session: the first client device continuously captures (656) video using a camera at the first client device, while capturing the continuous speech input at the first client device; and the first client device marks the continuously captured video with the respective start timestamps (and optionally, the respective end timestamps) of the two or more audio paragraphs, wherein the respective start timestamps (and, optionally the respective end timestamps) are used by the second client device (or the server) to synchronize presentation of the video and respective translations of the two or more audio paragraphs at the second client device.

It should be understood that the particular order in which the operations in FIGS. 6A-6G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 600 described above.

FIGS. 7A-7F illustrate a flowchart diagram of a method 700 of providing audio communication session between two or more client devices. In some embodiments, method 600 is performed by a server, in conjunction with two or more client devices. For example, in some embodiments, method 600 is performed by server 108 in conjunction with client devices 104-1 and 104-2 or components thereof (e.g., client-side modules 102, FIGS. 1-2). In some embodiments, method 700 is governed by instructions that are stored in a non-transitory computer readable storage medium and the instructions are executed by one or more processors of the client and server systems. Optional operations are indicated by dashed lines (e.g., boxes with dashed-line borders).

Through a server, a first client device has established an audio and/or video communication session with a second client device over the network (e.g., a user of the first device and a user of the second device have established a real-time video conference over the Internet through a server of an online teleconference service provider). During the audio and/or video communication session: the server receives (702) a first audio transmission from the second client device, wherein the first audio transmission is provided by the second client device in a source language that is distinct from a default language associated with the first client device (e.g., a default language that is automatically selected for the first client device by the server or a preferred language that is already specified by a user in a language setting of the first client device before the start of the audio and/or video communication session). The server obtains (e.g., from the first client device, and/or optionally, another server), one or more current user language attributes (e.g., facial features of the user at the first client device, geolocation information (e.g., current location and/or recent locations), audio message received locally at the first client device, etc.) for the first client device, wherein the one or more current user language attributes are indicative of a current language that is used for the audio and/or video communication session at the first client device. In accordance with a determination that the one or more current user language attributes suggest a target language that is currently used for the audio and/or video communication session at the first client device, and in accordance with a determination that the target language is distinct from the default language associated with the first client device (706): the server obtains (708) a translation of the first audio transmission from the source language into the target language; and the server sends (710), to the first client device, the translation of the first audio transmission in the target language, wherein the translation is presented to a user at the first client device. For example, in some embodiments, the target language is suggested by the first client device. In some embodiments, the target language is suggested by the server. In some embodiments, the first client device determines whether or not the target language is the same as the default language associated with the first client device. In some embodiments, the server makes the determination regarding whether the target language is the same as the default language associated with the first client device. In some embodiments, the translation of the first audio transmission in the target language is presented as a textual output at the first client device. In some embodiments, the translation of the first audio transmission is provided as an audio output at the first client device. In some embodiments, both the textual representation and the audible representation of the translation are provided at the first client device (e.g., synchronized to portion the video that corresponds to the first audio transmission, text pattern or audio pattern).

In some embodiments, obtaining the one or more current user language attributes and suggesting the target language that is currently used for the audio and/or video communication session at the first client device (e.g., step 704) further includes: receiving (712), from the first client device, facial features of the current user and a current geolocation of the first client device; determining (714) a relationship between the facial features of the current user and the current geolocation of the first client device (e.g., whether the facial features suggests a ethnicity or nationality that is sufficiently correlated (e.g., in accordance with predefined criteria) with the current geolocation of the first client device); and suggesting (716) the target language according to a determination that the relationship meets predefined criteria (e.g., in some embodiments, if the facial feature and the geolocation are both correlated with the same language, and that language is suggested as the target language).

In some embodiments, obtaining the one or more current user language attributes and suggesting the target language that is currently used for the audio and/or video communication session at the first client device (e.g., step 704) further includes: receiving (718), from the first client device, an audio message that has been received locally at the first client device; analyzing (720) linguistic characteristics of the audio message received locally at the first client device; and suggesting (722) the target language that is currently used for the audio and/or video communication session at the first client device in accordance with a result of analyzing the linguistic characteristics of the audio message.

In some embodiments, the server obtains (732) vocal characteristics (e.g., a voiceprint, or a predefined set of characteristics such as frequencies, tone, pitch, duration, amplitude, etc. of a person's voice) of a voice in the first audio transmission; and the sever, according to the vocal characteristics of the voice in the first audio transmission, generates (734) a simulated first audio transmission that includes the translation of the first audio transmission spoken in the target language in accordance with the vocal characteristics of the voice of the first audio transmission. In some embodiments, sending, to the first client device, the translation of the first audio transmission in the target language to a user at the first client device (e.g., step 710) includes: sending (736), to the first client device, a textual representation of the translation of the first audio transmission in the target language to the user at the first client device; and sending (738), to the first client device, the simulated first audio transmission that is generated in accordance with the vocal characteristics of the voice in the first audio transmission (e.g., the simulated first audio transmission in the target language is sent to the first client device in lieu of the original first audio transmission in the source language). In some embodiments, transmission of a segment of the video transmission to the first client device is delayed such that the video transmission to the first client device is synchronized with transmission of the simulated first audio transmission to the first client device.

In some embodiments, receiving a first audio transmission from the second client device (e.g., step 702) further includes: receiving (742) two or more audio packets of the first audio transmission from the second client device, wherein the two or more audio packets have been sent from the second client device sequentially according to respective timestamps of the two or more audio packets, and wherein each respective timestamp is indicative of a start time of a corresponding audio paragraph identified in the first audio transmission. In some embodiments, the two or more audio packets may be received out of sequence by the server, and the server rearranges the audio packets in accordance with the timestamps. In some embodiments, the server does not order the received packets based on their respective timestamps, and instead, the server only orders the translations of the audio paragraphs in the two or more audio packets based on the respective timestamps of the two or more audio packets, after the translations of the at least two of the audio paragraphs have been obtained. In some embodiments, the obtaining the translation of the first audio transmission from the source language into the target language and sending the translation of the first audio transmission in the target language to the first client device (e.g., steps 708 and 710) further comprise: obtaining (744) respective translations of the two or more audio packets from the source language into the target language sequentially according to the respective timestamps of the two or more audio packets; and sending (746) a first translation of at least one of the two or more audio packets to the first client device after the first translation is completed and before translation of at least another one of the two or more audio packets is completed.

In some embodiments, the server receives (748) a first video transmission while receiving the first audio transmission from the first client device, wherein the first video transmission is marked with the same set of timestamps as the two or more audio packets; and sends (750) the first video transmission and the respective translations of the two or more audio packets in the first audio transmission with the same set of timestamps to the first client device such that the first client device synchronously present the respective translations of the two or more audio packets of the first audio transmission and the first video transmission according to the same set of timestamps. In some embodiments, the server receives a continuous audio stream and a continuous video stream from the first client device, e.g., through a dedicated network connection used for the audio and/or video communication session. The server extracts audio paragraphs out of the continuous audio stream one by one (e.g., based on detection of predefined breaks in the continuous speech input embodied in the continuous audio stream). For example, the server generates an audio packet for each identified audio paragraph and sends the audio packets (e.g., as opposed to the continuous audio stream) to a translation server or a server-side translation module as the end of the audio paragraph is detected, while the server continues to receive the audio and video streams. In some embodiments, the server transmits the video stream to the second client device as a continuous video stream, and transmits the translations of the audio packets as audio and textual data packets to the second client device, where the second client device synchronizes the presentation of the video and the translations of the audio packets. In some embodiments, the server inserts the translations of the audio packets at appropriate locations of the video stream and sends the video streams to the first client device with the embedded translations.

It should be understood that the particular order in which the operations in FIGS. 7A-7F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein are also applicable in an analogous manner to method 600 described above.

Figure 8:
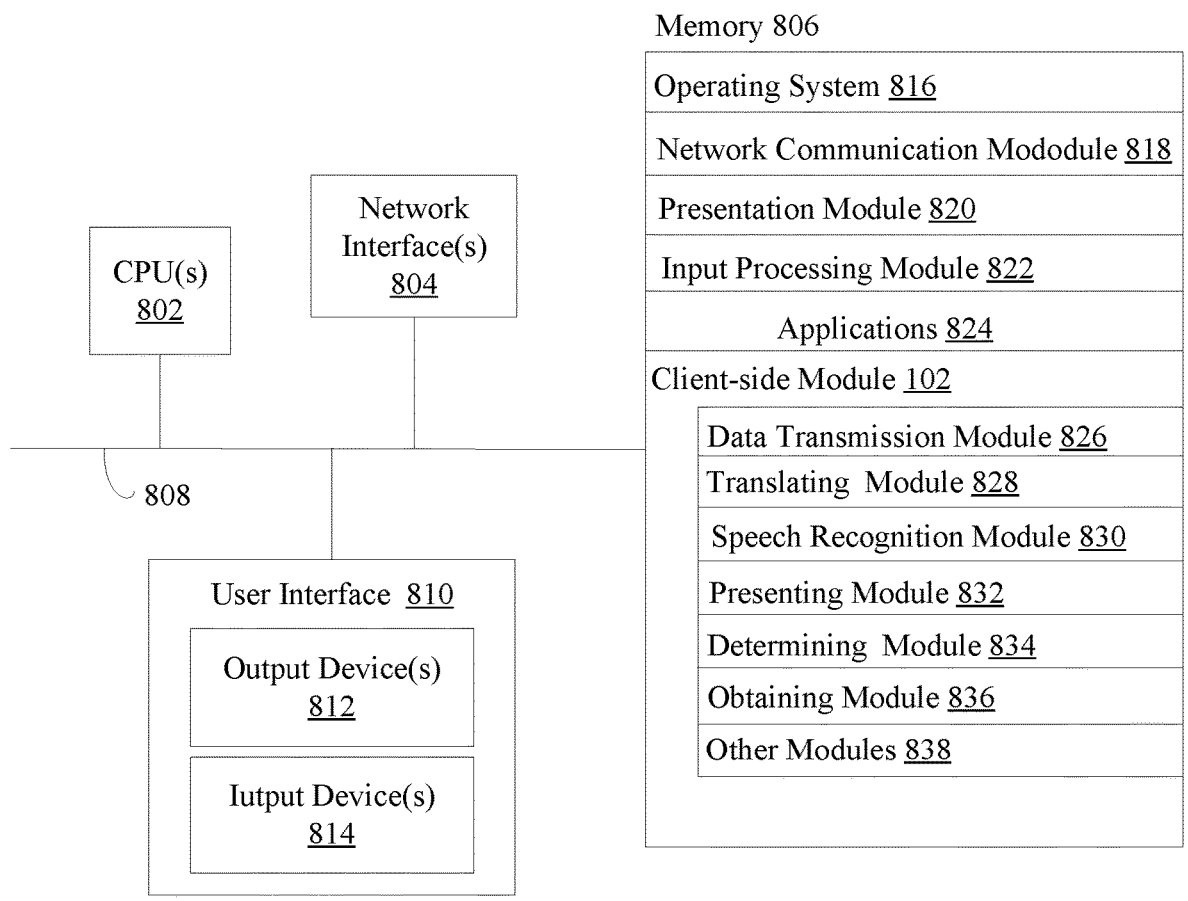
FIG. 8 is a block diagram of a client device in accordance with some embodiments.

FIG. 8 is a block diagram illustrating a representative client device 104 associated with a user in accordance with some embodiments. Client device 104, typically, includes one or more processing units (CPUs) 802, one or more network interfaces 804, memory 806, and one or more communication buses 808 for interconnecting these components (sometimes called a chipset). Client device 104 also includes a user interface 810. User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 further includes sensors, which provide context information as to the current state of client device 104 or the environmental conditions associated with client device 104. Sensors include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- operating system 816 including procedures for handling various basic system services and for performing hardware dependent tasks;
- network communication module 818 for connecting client device 104 to other computing devices (e.g., server system 108) connected to one or more networks 110 via one or more network interfaces 804 (wired or wireless);
- presentation module 820 for enabling presentation of information (e.g., a user interface for application(s) or a social networking platform, widgets, websites and web pages thereof, and/or games, audio and/or video content, text, etc.) at client device 104 via one or more output devices 812 (e.g., displays, speakers, etc.) associated with user interface 810;
- input processing module 822 for detecting one or more user inputs or interactions from one of the one or more input devices 814 and interpreting the detected input or interaction;
- one or more applications 824 for execution by client device 104 (e.g., games, application marketplaces, payment platforms, and/or other web or non-web based applications);
- client-side module 102, which provides client-side data processing and functionalities for real-time audio/video communication, including but not limited to:
  - data transmission module 826 for transmitting audio/video/textual data to and from the server and other client devices;
  - translation module 828 for translating audio or text from one language to another language;
  - speech recognition module 830 for performing speech-to-text conversion on speech audio input;
  - presenting module 832 for presenting original audio/video and/or translations in audio and/or textual forms;
  - determining module 834 for determining the target language and whether the target language of a client device is the same as a default language set for the client device;
  - obtaining module 836 for obtaining current language attributes of the client device; and
  - other modules 838 for performing other functions set forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Figure 9:
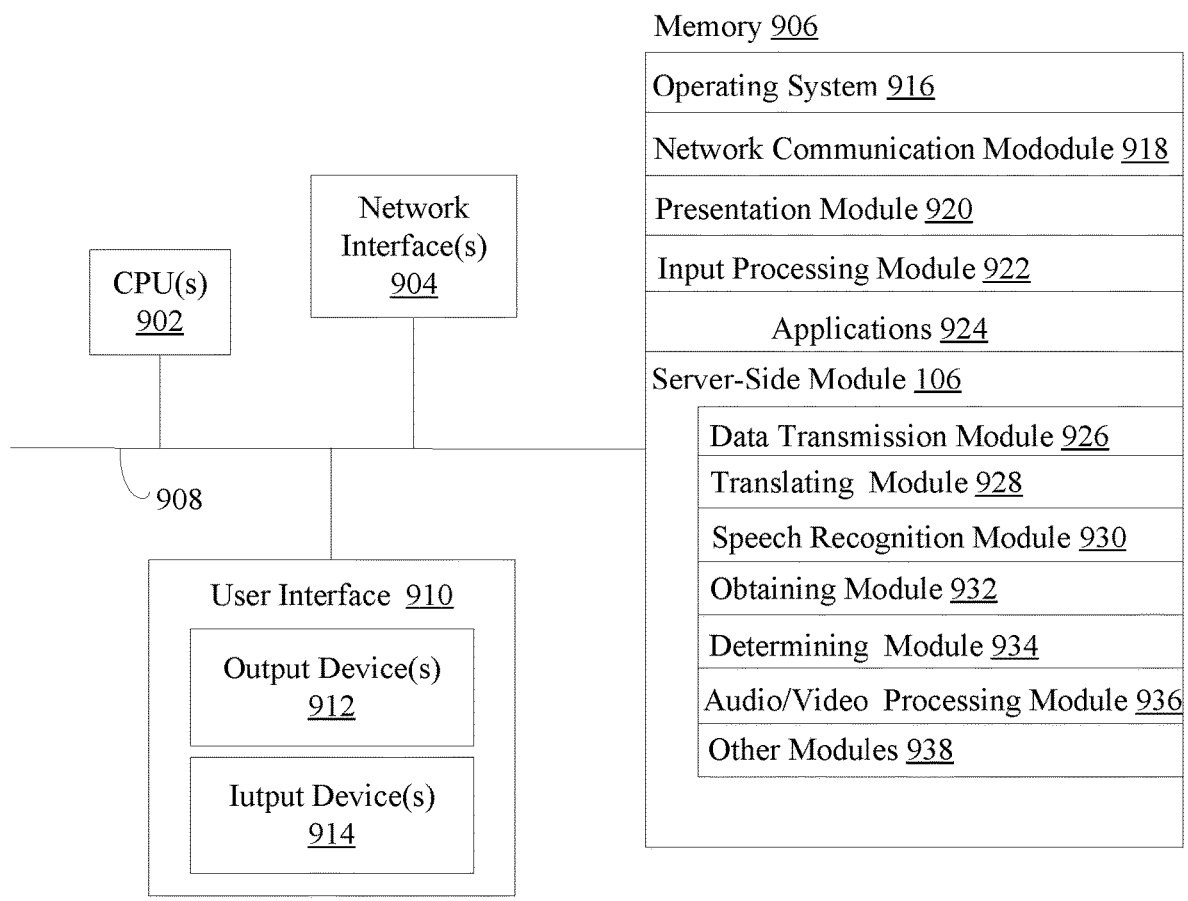
FIG. 9 is a block diagram of a server system in accordance with some embodiments.

FIG. 9 is a block diagram illustrating server system 108 in accordance with some embodiments. Server system 108, typically, includes one or more processing units (CPUs) 902, one or more network interfaces 904 (e.g., including I/O interface to one or more clients 114 and I/O interface to one or more external services), memory 906, and one or more communication buses 908 for interconnecting these components (sometimes called a chipset). Server 108 also optionally includes a user interface 910. User interface 910 includes one or more output devices 912 that enable presentation of information and one or more input devices 914 that enable user input. Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, optionally, includes one or more storage devices remotely located from one or more processing units 902. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- operating system 916 including procedures for handling various basic system services and for performing hardware dependent tasks;
- network communication module 918 for connecting server system 108 to other computing devices (e.g., client devices 104 and external service(s)) connected to one or more networks 110 via one or more network interfaces 904 (wired or wireless);
- presentation module 920 for enabling presentation of information;
- input processing module 922 for detecting one or more user inputs or interactions from one of the one or more input devices 814 and interpreting the detected input or interaction;
- one or more server applications 924 for managing the server operation;
- server-side module 106, which provides server-side data processing and functionalities for the facilitating the audio/video communication between client devices, including but not limited to:
  - data transmission module 926 for transmitting audio/video/textual data to and from the server and other client devices;
  - translation module 928 for translating audio or text from one language to another language;

speech recognition module 930 for performing speech-to-text conversion on speech audio input;
obtaining module 932 for obtaining current language attributes of the client device;
determining module 934 for determining the target language and whether the target language of a client device is the same as a default language set for the client device;
audio/video processing module 936 for processing the input stream for audio processing and video processing separately; and
other modules 938 for performing other functions set forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 1-5, respectively, are merely illustrative, and different configurations of the modules for implementing the functions described herein are possible in various embodiments.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of processing audio communications over a network, comprising:
at a first client device that has one or more processors and memory, the first client device having established an audio and/or video communication session with a second client device over the network through one or more servers:
during the audio and/or video communication session:
receiving a first audio transmission from the second client device, wherein the first audio transmission is provided by the second client device in a source language that is distinct from a default language associated with the first client device;
obtaining one or more current user language attributes for the first client device, wherein the one or more current user language attributes are indicative of a current language that is used for the audio and/or video communication session at the first client device;
in accordance with a determination that the one or more current user language attributes suggest a target language that is currently used for the audio and/or video communication session at the first client device, and in accordance with a determination that the target language is distinct from the default language associated with the first client device:
obtaining a translation of the first audio transmission from the source language from the source language into the target language;
presenting the translation of the first audio transmission in the target language to a user at the first client device;
obtaining a set of vocal characteristics of a voice in the first audio transmission;
according to a determination that a server load is below a predetermined threshold, generating a simulated first audio transmission that includes the translation of the first audio transmission spoken in the target language in accordance with the set of vocal characteristics of the voice of the first audio transmission, and
according to a determination that the server load is above the predetermined threshold, generating the simulated first audio transmission that includes the translation of the first audio transmission spoken in the target language in accordance with a subset of the vocal characteristics of the voice of the first audio transmission.

2. The method of claim 1, wherein the obtaining the one or more current user language attributes for the first client device includes:
obtaining facial features of the user at the first client device and obtaining geolocation information of the first client device; and
the facial features of the user at the first client device and the geolocation information of the first client device are utilized in combination to suggest the target language as the current language that is used for the first client device instead of the default language that is associated with the first client device.

3. The method of claim 1, wherein the obtaining the one or more current user language attributes for the first client device includes:
obtaining an audio input received locally at the first client device during the audio and/or video communication session; and
the audio input that is received locally at the first client device is analyzed linguistically to suggest the target language as the current language that is used at the first client device.

4. The method of claim 1, wherein the presenting the translation of the first audio transmission in the target language to a user at the first client device includes:
presenting a textual representation of the translation of the first audio transmission in the target language to the user at the first client device; and
presenting a simulated first audio transmission that is generated in accordance with vocal characteristics of a voice in the first audio transmission.

5. The method of claim 1, further comprising:
during the audio and/or video communication session:

detecting continuous speech input from a user located at the first client device;

marking a start time of the first continuous speech input as a beginning of a first audio paragraph detected at the first client device;

detecting a first predefined break in the continuous speech input at the first client device;

in response to detecting the first predefined break in the continuous speech input, marking a start time of the first predefined break as an end of the first audio paragraph detected at the first client device, wherein the first audio paragraph is included in a second audio transmission that is sent to the second client device.

6. The method of claim 5, further comprising:

after detecting the first predefined break in the continuous speech input, generating a first audio packet that includes the first audio paragraph;

sending the first audio packet to the second client device as a first portion of the second audio transmission; and while generating the first audio packet and sending the first audio packet:

continuing to detect the continuous speech input from the user located at the first client device, wherein at least a portion of the continuous speech input that is detected while generating and sending the first audio packet is included in the second audio transmission as a second portion of the second audio transmission.

7. The method of claim 6, wherein:

two or more audio paragraphs including the first audio paragraph and the second audio paragraph are translated into the source language of the first audio transmission for presentation at the second client device.

8. The method of claim 5, further comprising:

during the audio and/or video communication session:

identifying two or more audio paragraphs in a continuous speech input; and generating a respective audio packet for each of the two or more audio paragraphs; and sending the respective audio packets for the two or more audio paragraphs to the second client device sequentially according to the respective start time stamps thereof.

9. The method of claim 8, further comprising:

during the audio and/or video communication session:

continuously capturing video using a camera at the first client device, while capturing the continuous speech input at the first client device; and marking the continuously captured video with the respective start timestamps of the two or more audio paragraphs, wherein the respective start timestamps to synchronize presentation of the video and respective translations of the two or more audio paragraphs at the second client device.

10. An electronic device that serves as a first client device that has established an audio and/or video communication session with a second client device over a network through one or more servers, comprising:

one or more processors;

memory; and one or more programs, wherein the one or more programs are stored in the memory and configured to be executed by the one or more processors, the one or more programs including instructions for:

during the audio and/or video communication session:

receiving a first audio transmission from the second client device, wherein the first audio transmission is provided by the second client device in a source language that is distinct from a default language associated with the first client device;

obtaining one or more current user language attributes for the first client device, wherein the one or more current user language attributes are indicative of a current language that is used for the audio and/or video communication session at the first client device;

in accordance with a determination that the one or more current user language attributes suggest a target language that is currently used for the audio and/or video communication session at the first client device, and in accordance with a determination that the target language is distinct from the default language associated with the first client device:

obtaining a translation of the first audio transmission from the source language into the target language;

presenting the translation of the first audio transmission in the target language to a user at the first client device;

obtaining a set of vocal characteristics of a voice in the first audio transmission;

according to a determination that a server load is below a predetermined threshold, generating a simulated first audio transmission that includes the translation of the first audio transmission spoken in the target language in accordance with the set of vocal characteristics of the voice of the first audio transmission, and according to a determination that the server load is above the predetermined threshold, generating the simulated first audio transmission that includes the translation of the first audio transmission spoken in the target language in accordance with a subset of the vocal characteristics of the voice of the first audio transmission.

11. The electronic device of claim 10, wherein the obtaining the one or more current user language attributes for the first client device includes:

obtaining facial features of the user at the first client device and obtaining geolocation information of the first client device; and the facial features of the user at the first client device and the geolocation information of the first client device are utilized in combination to suggest the target language as the current language that is used for the first client device instead of the default language that is associated with the first client device.

12. The electronic device of claim 10, wherein the obtaining the one or more current user language attributes for the first client device includes:

obtaining an audio input received locally at the first client device during the audio and/or video communication session; and the audio input that is received locally at the first client device is analyzed linguistically to suggest the target language as the current language that is used at the first client device.

13. The electronic device of claim 10, wherein the presenting the translation of the first audio transmission in the target language to a user at the first client device includes:

presenting a textual representation of the translation of the first audio transmission in the target language to the user at the first client device; and presenting a simulated first audio transmission that is generated in accordance with vocal characteristics of a voice in the first audio transmission.

14. The electronic device of claim 10, wherein the one or more programs further include instructions for:
during the audio and/or video communication session:
detecting continuous speech input from a user located at the first client device;
marking a start time of the first continuous speech input as a beginning of a first audio paragraph detected at the first client device;
detecting a first predefined break in the continuous speech input at the first client device;
in response to detecting the first predefined break in the continuous speech input, marking a start time of the first predefined break as an end of the first audio paragraph detected at the first client device, wherein the first audio paragraph is included in a second audio transmission that is sent to the second client device.

15. A non-transitory computer readable storage medium storing one or more programs, the one or more programs comprising instructions, which when executed by an electronic device, cause the device to perform operations comprising:
at a first client device that has established an audio and/or video communication session with a second client device over the network through one or more servers:
during the audio and/or video communication session:
receiving a first audio transmission from the second client device, wherein the first audio transmission is provided by the second client device in a source language that is distinct from a default language associated with the first client device;
obtaining one or more current user language attributes for the first client device, wherein the one or more current user language attributes are indicative of a current language that is used for the audio and/or video communication session at the first client device;
in accordance with a determination that the one or more current user language attributes suggest a target language that is currently used for the audio and/or video communication session at the first client device, and in accordance with a determination that the target language is distinct from the default language associated with the first client device:
obtaining a translation of the first audio transmission from the source language from the source language into the target language;
presenting the translation of the first audio transmission in the target language to a user at the first client device;
obtaining a set of vocal characteristics of a voice in the first audio transmission;
according to a determination that a server load is below a predetermined threshold, generating a simulated first audio transmission that includes the translation of the first audio transmission spoken in the target language in accordance with the set of vocal characteristics of the voice of the first audio transmission, and
according to a determination that the server load is above the predetermined threshold, generating the simulated first audio transmission that includes the translation of the first audio transmission spoken in the target language in accordance with a subset of the vocal characteristics of the voice of the first audio transmission.

16. The non-transitory computer readable storage medium of claim 15, wherein the obtaining the one or more current user language attributes for the first client device includes:
obtaining facial features of the user at the first client device and obtaining geolocation information of the first client device; and
the facial features of the user at the first client device and the geolocation information of the first client device are utilized in combination to suggest the target language as the current language that is used for the first client device instead of the default language that is associated with the first client device.

17. The non-transitory computer readable storage medium of claim 15, wherein the obtaining the one or more current user language attributes for the first client device includes:
obtaining an audio input received locally at the first client device during the audio and/or video communication session; and
the audio input that is received locally at the first client device is analyzed linguistically to suggest the target language as the current language that is used at the first client device.

* * * * *